US010506252B2

(12) United States Patent
Rusanovskyy et al.

(10) Patent No.: US 10,506,252 B2
(45) Date of Patent: *Dec. 10, 2019

(54) ADAPTIVE INTERPOLATION FILTERS FOR VIDEO CODING

(71) Applicant: Conversant Wireless Licensing S.a r.l., Luxembourg (LU)

(72) Inventors: Dmytro Rusanovskyy, Tampere (FI); Kemal Ugur, Tampere (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,686

(22) Filed: Dec. 8, 2016

(65) Prior Publication Data

US 2017/0094272 A1    Mar. 30, 2017

Related U.S. Application Data

(63) Continuation of application No. 13/962,009, filed on Aug. 8, 2013, now Pat. No. 9,769,490, which is a (Continued)

(51) Int. Cl.
*H04N 19/523* (2014.01)
*H04N 7/12* (2006.01)
(Continued)

(52) U.S. Cl.
CPC ............. *H04N 19/523* (2014.11); *H04N 7/12* (2013.01); *H04N 19/105* (2014.11);
(Continued)

(58) Field of Classification Search
CPC .. H04N 19/117; H04N 19/105; H04N 19/436; H04N 19/523; H04N 19/172;
(Continued)

(56) References Cited

U.S. PATENT DOCUMENTS 6,396,872 B1 *  5/2002  Sugiyama .......... H03H 21/0012
                                                    370/290
7,480,603 B1 *  1/2009  San ..................... G06F 17/5045
                                                    703/13
(Continued)

*Primary Examiner* — Obaidul Huq
(74) *Attorney, Agent, or Firm* — Conversant Wireless Licensing

(57) ABSTRACT

In digital video image encoding and decoding, a filter type is selected based on symmetrical properties of the images and coefficient values of an interpolation filter are calculated based on the selected filter type. Coefficient values, filter tap-length and selected filter-type are provided in the encoded video data. Coefficient values are also calculated based on a prediction signal representative of the difference between a video frame and a reference image. The prediction signal is calculated from the reference image based on a predefined base filter and motion estimation performed on the video frame. The predefined base filter has fixed coefficient values. Coefficient values are selected from interpolation of pixel values in a selected image segment in the video frame. Symmetry properties of images can be a vertical symmetry, a horizontal symmetry and a combination thereof, so that only a portion of the filter coefficients are coded.

8 Claims, 15 Drawing Sheets

Related U.S. Application Data continuation of application No. 12/008,254, filed on Jan. 8, 2008, now Pat. No. 8,509,316.

(60) Provisional application No. 60/884,185, filed on Jan. 9, 2007, provisional application No. 60/879,762, filed on Jan. 9, 2007.

(51) Int. Cl.

| | |
|---|---|
| *H04N 19/63* | (2014.01) |
| *H04N 19/117* | (2014.01) |
| *H04N 19/136* | (2014.01) |
| *H04N 19/105* | (2014.01) |
| *H04N 19/436* | (2014.01) |
| *H04N 19/42* | (2014.01) |
| *H04N 19/172* | (2014.01) |
| *H04N 19/182* | (2014.01) |

(52) U.S. Cl.
CPC ......... *H04N 19/117* (2014.11); *H04N 19/136* (2014.11); *H04N 19/436* (2014.11); *H04N 19/63* (2014.11); *H04N 19/172* (2014.11); *H04N 19/182* (2014.11); *H04N 19/42* (2014.11)

(58) Field of Classification Search
CPC .... H04N 19/182; H04N 19/136; H04N 19/63; H04N 7/12; H04N 19/42
USPC .................. 375/240, 240.01, 240.26, 240.29
See application file for complete search history.

(56) References Cited

U.S. PATENT DOCUMENTS

| | | | |
|---|---|---|---|
| 2003/0169931 A1* | 9/2003 | Lainema | H04N 19/197 382/236 |
| 2004/0062307 A1* | 4/2004 | Hallapuro | H04N 19/139 375/240.13 |
| 2004/0076333 A1* | 4/2004 | Zhang | H04N 19/197 382/238 |

* cited by examiner

| INTEGER PIXEL | *filt-a*<br>1D non-symmetric filter<br><br>6 coefs. transmitted | *filt-b*<br>1D symmetric filter<br><br>3 coefs. transmitted | *filt-c*<br>Horizontally symmetric of filt-a<br>No coefs transmitted |
|---|---|---|---|
| *filt-d*<br>1D non-symmetric filter<br><br>6 coefs. transmitted | *filt-e*<br>2D non-symmetric filter<br><br>36 coefs. transmitted | *filt-f*<br>2D horizontally symmetric filter<br>18 coefs. transmitted | *filt-g*<br>Horizontally symmetric of filt-e<br>No coefs transmitted |
| *filt-h*<br>1D non-symmetric filter<br><br>6 coefs. transmitted | *filt-i*<br>2D non-symmetric filter<br><br>36 coefs. transmitted | *filt-j*<br>2D horizontally symmetric filter<br>18 coefs. transmitted | *filt-k*<br>Horizontally symmetric of filt-i<br>No coefs transmitted |
| *filt-l*<br>1D non-symmetric filter<br><br>6 coefs. transmitted | *filt-m*<br>2D non-symmetric filter<br><br>36 coefs. transmitted | *filt-n*<br>2D horizontally symmetric filter<br>18 coefs. transmitted | *filt-o*<br>Horizontally symmetric of filt-m<br>No coefs transmitted |

FIG. 2

| INTEGER PIXEL | filt-a<br>1D non-symmetric filter<br><br>6 coefs. transmitted | filt-b<br>1D non-symmetric filter<br><br>6 coefs. transmitted | filt-c<br>1D non-symmetric filter<br><br>6 coefs. transmitted |
|---|---|---|---|
| filt-d<br>1D non-symmetric filter<br><br>6 coefs. transmitted | filt-e<br>2D non-symmetric filter<br><br>36 coefs. transmitted | filt-f<br>2D non-symmetric filter<br><br>36 coefs. transmitted | filt-g<br>2D non-symmetric filter<br><br>36 coefs. transmitted |
| filt-h<br>1D symmetric filter<br><br>3 coefs. transmitted | filt-i<br>2D vertically-symmetric filter<br>18 coefs. transmitted | filt-j<br>2D vertically-symmetric filter<br>18 coefs. transmitted | filt-k<br>2D vertically-symmetric filter<br>18 coefs. transmitted |
| filt-l<br>Vertically symmetric of filt-d<br>No coefs transmitted | filt-m<br>Vertically symmetric of filt-e<br>No coefs transmitted | filt-n<br>Vertically symmetric of filt-f<br>No coefs transmitted | filt-o<br>Vertically symmetric of filt-g<br>No coefs transmitted |

FIG. 3

| INTEGER PIXEL | *filt-a* 1D non-symmetric filter 6 coefs. transmitted | *filt-b* 1D symmetric filter 3 coefs. transmitted | *filt-c* Horizontally symmetric of filt-a No coefs transmitted |
|---|---|---|---|
| *filt-d* 1D non-symmetric filter 6 coefs. transmitted | *filt-e* 2D non-symmetric filter 36 coefs. transmitted | *filt-f* 2D horizontally symmetric filter 18 coefs. transmitted | *filt-g* Horizontally symmetric of filt-e No coefs transmitted |
| *filt-h* 1D symmetric filter 3 coefs. transmitted | *filt-i* 2D vertically-symmetric filter 18 coefs. transmitted | *filt-j* 2D horiz - vert. symmetric filter 9 coefs. transmitted | *filt-k* Horizontally symmetric of filt-i No coefs transmitted |
| *filt-l* Vertically symmetric of filt-d No coefs transmitted | *filt-m* Vertically symmetric of filt-e No coefs transmitted | *filt-n* Vertically symmetric of filt-f No coefs transmitted | *filt-o* Vertically symmetric of filt-g No coefs transmitted |

FIG. 4

| Filter Combination | Number of Filters | Filter Identification Needed at MB Level? |
|---|---|---|
| F0 | 1 | No |
| F1 | 1 | No |
| F2 | 1 | No |
| F0-F1 | 2 | Yes |
| F1-F2 | 2 | Yes |
| F0-F2 | 2 | Yes |
| F0-F1-F2 | 3 | Yes |

ADAPTIVE INTERPOLATION FILTERS FOR VIDEO CODING

CROSS-REFERENCE TO RELATED APPLICATIONS

This application is a continuation of U.S. patent application Ser. No. 13/962,009, filed on Aug. 8, 2013 which is a continuation of U.S. patent application Ser. No. 12/008,254 filed Jan. 8, 2008 now U.S. Pat. No. 8,509,316 which claims the benefits of U.S. Provisional Patent Applications No. 60/879,762 and No. 60/884,185, both filed on Jan. 9, 2007. The above-identified application is herein incorporated by reference in its entirety.

FIELD OF THE INVENTION

The present invention is related to video coding and, more particularly, to motion compensated prediction in video compression.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Motion Compensated Prediction (MCP) is a technique used by many video compression standards to reduce temporal redundancy present in a video sequence. Temporal redundancy refers to those situations where objects, for example, appearing in one frame of the video sequence are likely to appear in subsequent frames. In MCP, a prediction for the current frame is formed using previously coded frame(s) and only the difference between the original and the prediction signal is encoded and sent to the decoder. The prediction signal, representative of a prediction frame, is formed by first dividing the frame into blocks, e.g. macroblocks, and searching a best match in the reference frame for each block. In this way, the motion of the block relative to reference frame is determined and this motion information is coded into the bitstream as motion vectors (MV). A decoder is able to reconstruct the exact prediction by decoding the motion vector data embedded in the bitstream.

The motion vectors do not necessarily have full-pixel accuracy but could have fractional pixel accuracy as well. This means that, motion vectors can point to fractional pixel locations of the reference image, or frame, where the fractional pixel locations can refer to, for example, locations "in between" image pixels. In order to obtain the samples at fractional pixel locations, interpolation filters are used in the MCP process. Conventional video coding standards describe how the decoder should obtain the samples at fractional pixel accuracy by defining an interpolation filter. In MPEG-2, for example, motion vectors can have at most half pixel accuracy and the samples at half pixel locations are obtained by averaging the neighboring samples at full-pixel locations. The H.264/AVC video coding standard supports motion vectors with up to quarter pixel accuracy where half pixel samples are obtained by symmetric-separable 6-tap filter and quarter pixel samples are obtained by averaging the nearest half or full pixel samples.

In order to improve the prediction performance in video coding, it is generally desirable to adapt interpolation filter coefficient values according to local properties of the image. These filters are referred to as adaptive interpolation filters (AIF). Certain methods and systems have been developed to provide interpolation filters with adaptive filter coefficient values to manage, for example, aliasing in an image acquisition process, such as those described in "Coding of Coefficients of two-dimensional non-separable Adaptive Wiener Interpolation Filter", Proc. VCIP 2005, SPIE Visual Communication & Image Processing, Beijing, China, July 2005, and in U.S. Patent Publication No. 2004/0161035 to Wedi, entitled "Device for Interpolating of Scanning Values and Image Encoder and Decoder," all of which are incorporated herein by reference in their entireties. International Patent Publication No. WO 03/058945, entitled "Coding Dynamic Filters," to Lainema, incorporated herein by reference in its entirety, describes coding filter coefficient with respect to a base-filter and adapting the base-filter according to statistics gleaned from a video sequence.

It would be desirable to further increase error resiliency in conjunction with the coding of filter coefficients and to keep the coding efficiency high.

SUMMARY OF THE INVENTION

In order to reduce the complexity of the interpolation step of a video decoder, the video decoder is configured to adapt the interpolation filter tap-length according to frame characteristics. According to an embodiment of the present invention, the encoder is configured to signal to the decoder a parameter such as tap_length at the slice header to indicate the length of the interpolation filter that will be used in the MCP process to reconstruct the video signal. The decoder, based on the received tap_length, constructs the interpolation filter, either by selecting one filter from a set of pre-defined filters or by using an algorithm that is known to both the encoder and the decoder.

In another embodiment of the present invention, tap_length is sent along with coefficient data for constructing 2D adaptive interpolation filters when the statistical characteristic of each image is assumed to be symmetric.

In yet another embodiment of the present invention, tap_length is sent along with coefficient data for constructing 2D adaptive interpolation filters when different symmetrical properties of images are used.

Furthermore, the present invention makes use of the local properties of the image in spatial domain. Instead of using a single filter for the entire image frame, macroblocks in a frame are classified and grouped according to their similarity and the optimal filter for each of these groups is computed for encoding. These optimally computed adaptive interpolation filters are referred to as macroblock level adaptive interpolation filters.

The various embodiments of the present invention increase the coding efficiency of a video coder that makes use of AIF by decreasing the number of bits used for coding the filter coefficients. Therefore, non-stationary properties of a video signal can be captured more accurately. A video encoder transmits filter coefficients as side information to a video decoder. The video encoder can change the filter coefficients on either a frame/slice or macroblock level by analyzing the video signal. The coefficients of each interpolation filter are differentially coded with respect to a base filter. The base filter can either be pre-defined or defined independently for each interpolation filter transmitted. If a separate base filter is used for each interpolation filter, the video encoder transmits the information needed to construct the base filter, which includes only a small number of coefficients (referred to as basis-coefficients), so that no significant overhead results from the transmission. The video decoder uses the basis-coefficients to construct the base filter, while the interpolation filter is reconstructed at the video decoder side using the constructed base-filter and the received filter coefficients.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 2 is a table showing the details of an HOR-AIF type filter for each sub-pixel.

FIG. 3 is a table showing the details of a VER-AIF type filter for each sub-pixel.

FIG. 4 is a table showing the details of an H+V-AIF type filter for each sub-pixel.

DETAILED DESCRIPTION OF THE INVENTION

Figure 1:
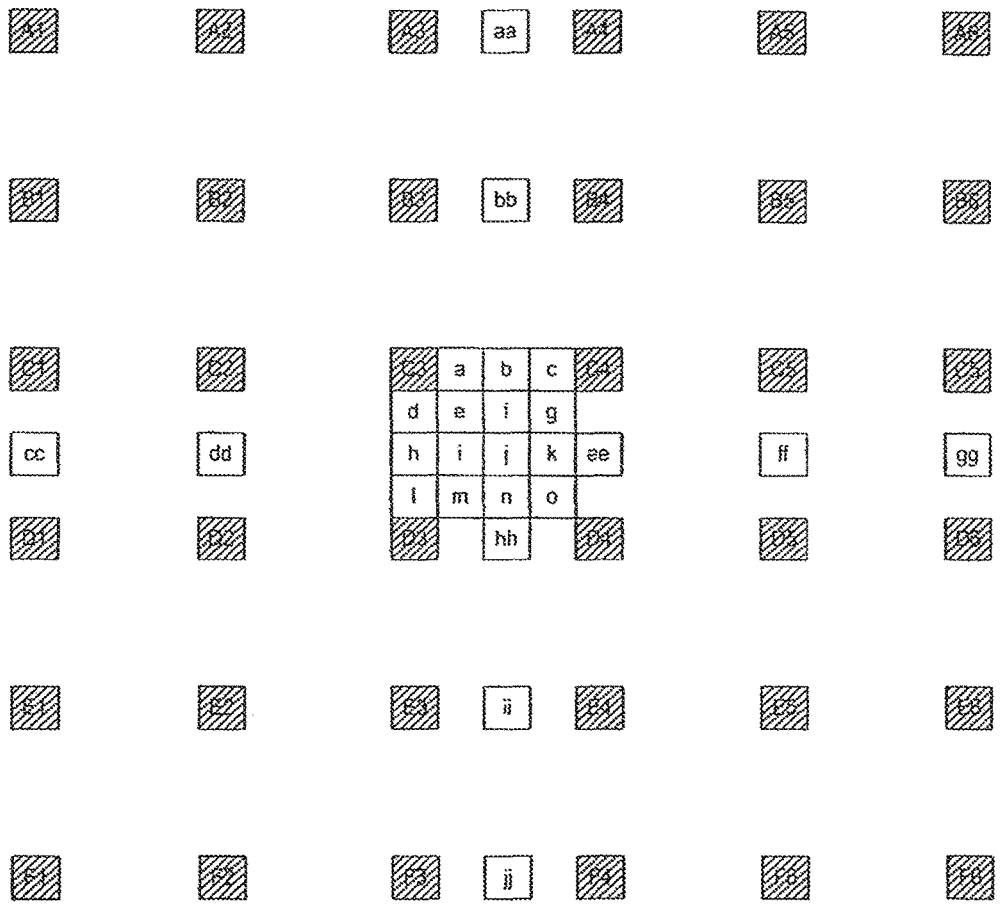
FIG. 1 shows the naming convention used for locations of integer and sub-pixel samples.

The operating principle of video coders employing motion compensated prediction is to minimize the amount of information in a prediction error frame $E_n(x,y)$, which is the difference between a current frame $I_n(x,y)$ being coded and a prediction frame $P_n(x,y)$. The prediction error frame is thus defined as follows:

$$E_n(x,y)=I_n(x,y)-P_n(x,y).$$

The prediction frame $P_n(x,y)$ is built using pixel values of a reference frame $R_n(x,y)$, which is generally one of the previously coded and transmitted frames, for example, the frame immediately preceding the current frame, and is available from the frame memory block of an encoder. More specifically, the prediction frame $P_n(x,y)$ is constructed by finding "prediction pixels" in the reference frame $R_n(x,y)$ which correspond substantially with pixels in the current frame. Motion information, describing the relationship (e.g. relative location, rotation, scale etc.) between pixels in the current frame and their corresponding prediction pixels in the reference frame, is derived and the prediction frame is constructed by moving the prediction pixels according to the motion information. In this way, the prediction frame is constructed as an approximate representation of the current frame, using pixel values in the reference frame. The prediction error frame referred to above therefore represents the difference between the approximate representation of the current frame provided by the prediction frame and the current frame itself. The basic advantage provided by video encoders that use motion compensated prediction arises from the fact that a comparatively compact description of the current frame can be obtained by the motion information required to form its prediction, together with the associated prediction error information in the prediction error frame.

Due to the large number of pixels in a frame, it is generally not efficient to transmit separate motion information for each pixel to the decoder. Instead, in most video coding schemes, the current frame is divided into larger image segments $S_k$, and motion information relating to the segments is transmitted to the decoder. For example, motion information is typically provided for each macroblock of a frame and the same motion information is then used for all pixels within the macroblock. In some video coding standards, a macroblock can be divided into smaller blocks, each smaller block being provided with its own motion information.

The motion information usually takes the form of motion vectors $[\Delta x(x,y), \Delta y(x,y)]$. The pair of numbers $\Delta x(x,y)$ and $\Delta y(x,y)$ represents the horizontal and vertical displacements of a pixel $(x,y)$ in the current frame $I_n(x,y)$ with respect to a pixel in the reference frame $R_n(x,y)$. The motion vectors $[\Delta x(x,y),\Delta y(x,y)]$ are calculated in the motion field estimation block and the set of motion vectors of the current frame $[\Delta x(\cdot),\Delta y(\cdot)]$ is referred to as the motion vector field.

Figure 5A:
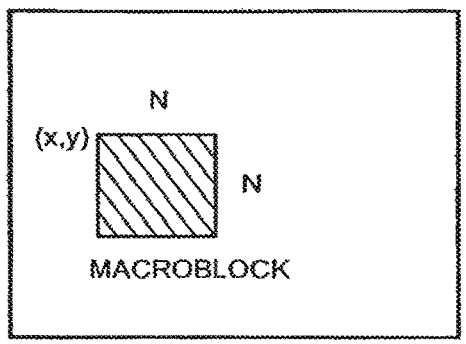
FIG. 5a shows a macroblock of a current frame.
Figure 5B:
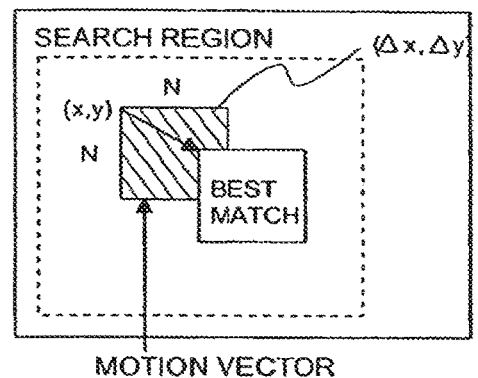
FIG. 5b shows a reference frame for block-matching.

Typically, the location of a macroblock in a current video frame is specified by the $(x,y)$ co-ordinate of its upper left-hand corner. Thus, in a video coding scheme in which motion information is associated with each macroblock of a frame, each motion vector describes the horizontal and vertical displacement $\Delta x(x,y)$ and $\Delta y(x,y)$ of a pixel representing the upper left-hand corner of a macroblock in the current frame $I_n(x,y)$ with respect to a pixel in the upper left-hand corner of a substantially corresponding block of prediction pixels in the reference frame $R_n(x,y)$ (as shown in FIG. 5b).

Motion estimation is a computationally intensive task. Given a reference frame $R_n(x,y)$ and, for example, a square macroblock comprising N×N pixels in a current frame (as shown in FIG. 5a), the objective of motion estimation is to find an N×N pixel block in the reference frame that matches the characteristics of the macroblock in the current picture according to some criterion. This criterion can be, for example, a sum of absolute differences (SAD) between the pixels of the macroblock in the current frame and the block of pixils in the reference frame with which it is compared. This process is known generally as "block matching". It should be noted that, in general, the geometry of the block to be matched and that in the reference frame do not have to be the same, as real-world objects can undergo scale changes, as well as rotation and warping. However, in current international video coding standards, such as those referred to above, only a translational motion model is used and thus fixed rectangular geometry is sufficient.

Figure 5C:
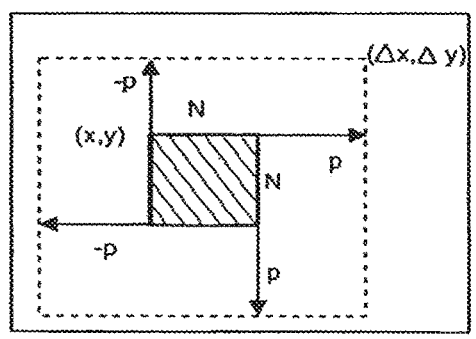
FIG. 5c shows a search region around the original location of the macroblock in the current frame.

Ideally, in order to achieve the best chance of finding a match, the whole of the reference frame should be searched. However, this is impractical as it imposes too high a computational burden on the video encoder. Instead, the search region is generally restricted to a region [−p, p] around the original location of the macroblock in the current frame, as shown in FIG. 5c.

Figure 6:
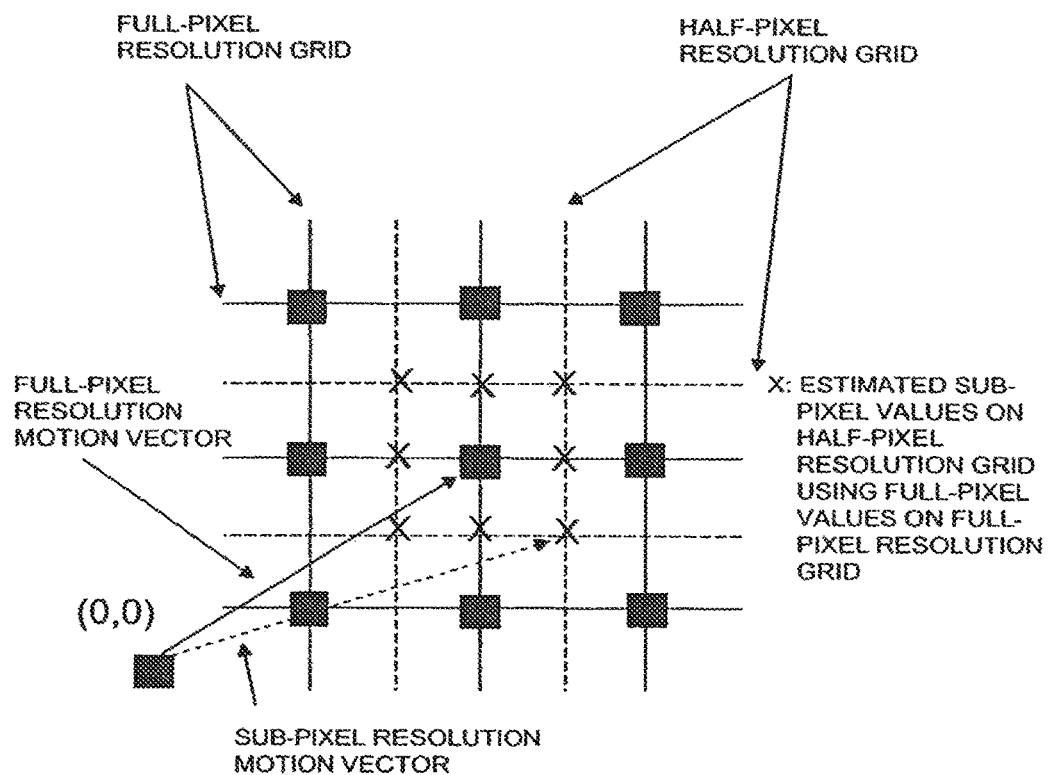
FIG. 6 shows the process of motion estimation to sub-pixel resolution, according to prior art.

Motion estimation with sub-pixel resolution can be implemented as a two-stage process, as illustrated in an exemplary fashion in FIG. 6, for a generic video coding scheme in which motion vectors may have full- or half-pixel resolution. In the first step, a motion vector having full-pixel resolution is determined using an appropriate motion estimation scheme, such as the block-matching process described above. The resulting motion vector, having full-pixel resolution is shown in FIG. 6.

In the second stage, the motion vector determined in the first stage is refined to obtain the desired half-pixel resolution. In the example illustrated in FIG. 6, this is done by forming eight new search blocks of 16×16 pixels, the location of the top-left corner of each block being marked with an X in FIG. 6. These locations are denoted as [Δx+m/2, Δy+n/2], where m and n can take the values −1, 0 and +1, but cannot be zero at the same time. As only the pixel values of original image pixels are known, the values (for example, luminance and/or chrominance values) of the sub-pixels residing at half-pixel locations are estimated for each of the eight new search blocks, using some form of interpolation scheme.

Figure 7:
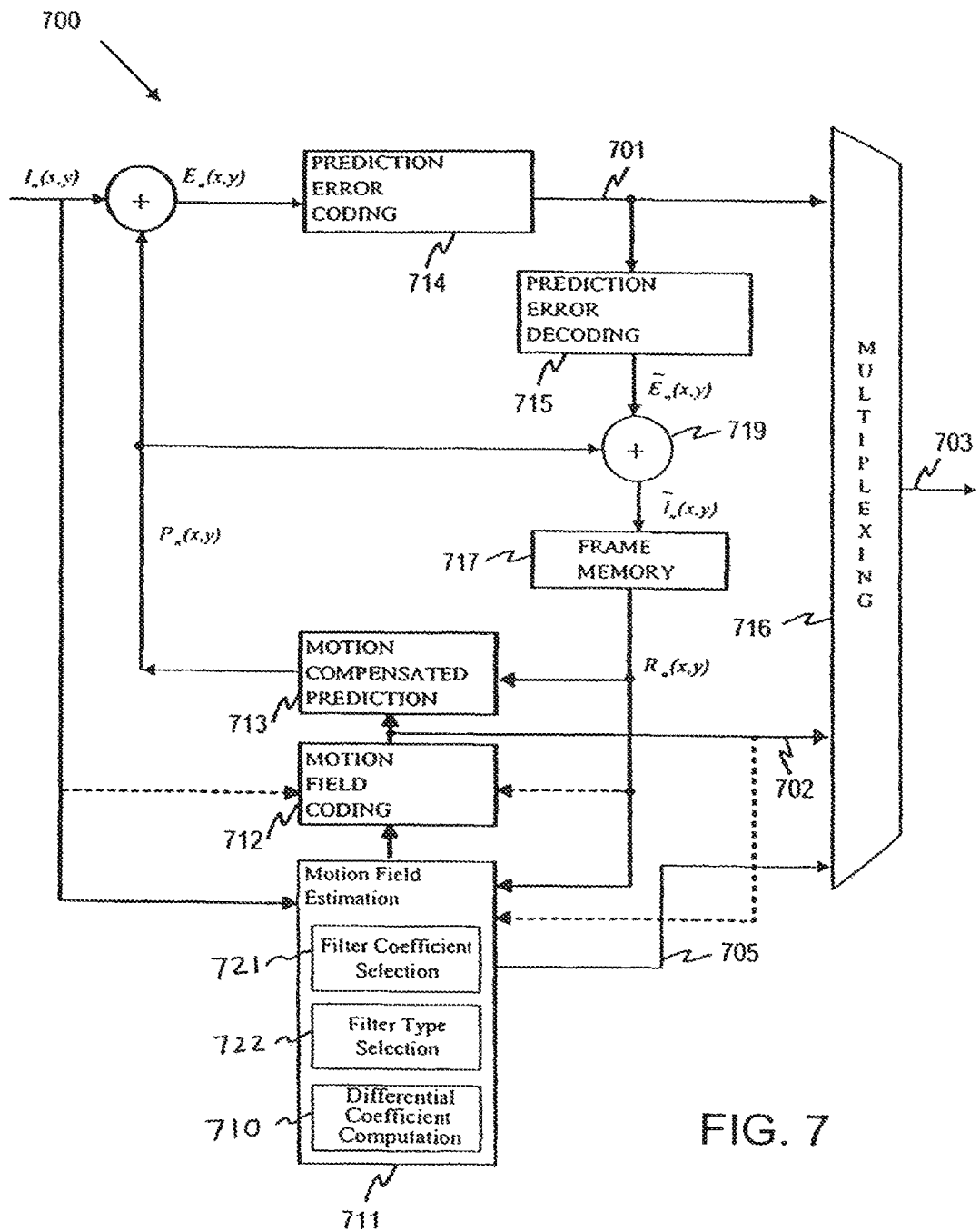
FIG. 7 is a block diagram illustrating a video encoder according to one embodiment of the present invention.

FIG. 7 is a schematic block diagram of a video encoder 700 implemented according to an embodiment of the invention. In particular video encoder 700 comprises a Motion Field Estimation block 711, a Motion Field Coding block 712, a Motion Compensated Prediction block 713, a Prediction Error Coding block 714, a Prediction Error Decoding block 715, a Multiplexing block 716, a Frame Memory 717, and an adder 719. As shown in FIG. 7, the Motion Field Estimation block 711 also includes a Filter Coefficient Selection block 721 and a Filter Type Selection block 722, which is used to select a filter-type from a set of five filter-types: the symmetrical filter that is associated with 56 coefficients, ALL-AIF, HOR-AIG, VER-AIF and H+V-AIF. The different filter types will have different symmetrical properties and different number of coefficients associated with the filters.

Operation of the video encoder 700 will now be considered in detail. In common with video encoders known from prior art, the video encoder 700, according to this embodiment of the present invention, employs motion compensated prediction with respect to a reference frame $R_n(x,y)$ to produce a bit-stream representative of a video frame being coded in INTER format. It performs motion compensated prediction to sub-pixel resolution and further employs an interpolation filter having dynamically variable filter coefficient values in order to form the sub-pixel values required during the motion estimation process.

Video encoder 700 performs motion compensated prediction on a block-by-block basis and implements motion compensation to sub-pixel resolution as a two-stage process for each block. In the first stage, a motion vector having full-pixel resolution is determined by block-matching, i.e., searching for a block of pixel values in the reference frame $R_n(x,y)$ that matches best with the pixel values of the current image block to be coded. The block matching operation is performed by Motion Field Estimation block 711 in co-operation with Frame Store 717, from which pixel values of the reference frame $R_n(x,y)$ are retrieved. In the second stage of motion compensated prediction, the motion vector determined in the first stage is refined to the desired sub-pixel resolution. To do this, the Motion Field Estimation block 711 forms new search blocks having sub-pixel resolution by interpolating the pixel values of the reference frame $R_n(x,y)$ in the region previously identified as the best match for the image block currently being coded (see FIG. 7). As part of this process, the Motion Field Estimation block 711 determines an optimum interpolation filter for interpolation of the sub-pixel values. Advantageously the coefficient values of the interpolation filter are adapted in connection with the encoding of each image block. In alternative embodiments, the coefficients of the interpolation filter may be adapted less frequently, for example once every frame, or at the beginning of a new video sequence to be coded.

Having interpolated the necessary sub-pixel values and formed new search blocks, Motion Field Estimation block 711 performs a further search in order to determine whether any of the new search blocks represents a better match to the current image block than the best matching block originally identified at full-pixel resolution. In this way Motion Field Estimation block 711 determines whether the motion vector representative of the image block currently being coded should point to a full-pixel or sub-pixel location.

The Motion Field Estimation block 711 outputs the identified motion vector to Motion Field Coding block 712, which approximates the motion vector using a motion model, as previously described. Motion Compensated Prediction block 713 then forms a prediction for the current image block using the approximated motion vector and prediction error information. The prediction is and subsequently coded in Prediction Error Coding block 714. The coded prediction error information for the current image block is then forwarded from Prediction Error Coding block 714 to Multiplexer block 716. Multiplexer block 716 also receives information about the approximated motion vector (in the form of motion coefficients) from Motion Field Coding block 712, as well as information about the optimum interpolation filter used during motion compensated prediction of the current image block from Motion Field Estimation Block 711. According to this embodiment of the present invention, Motion Field Estimation Block 711, based on the computational result computed by the differential coefficient computation block 710, transmits a set of difference values 705 indicative of the difference between the filter coefficients of the optimum interpolation filter for the current block and the coefficients of a predefined base filter 709 stored in the encoder 700. Multiplexer block 716 subsequently forms an encoded bit-stream 703 representative of the image current block by combining the motion information (motion coefficients), prediction error data, filter coefficient difference values and possible control information. Each of the different types of information may be encoded with an entropy coder prior to inclusion in the bit-stream and subsequent transmission to a corresponding decoder.

Figure 8A:
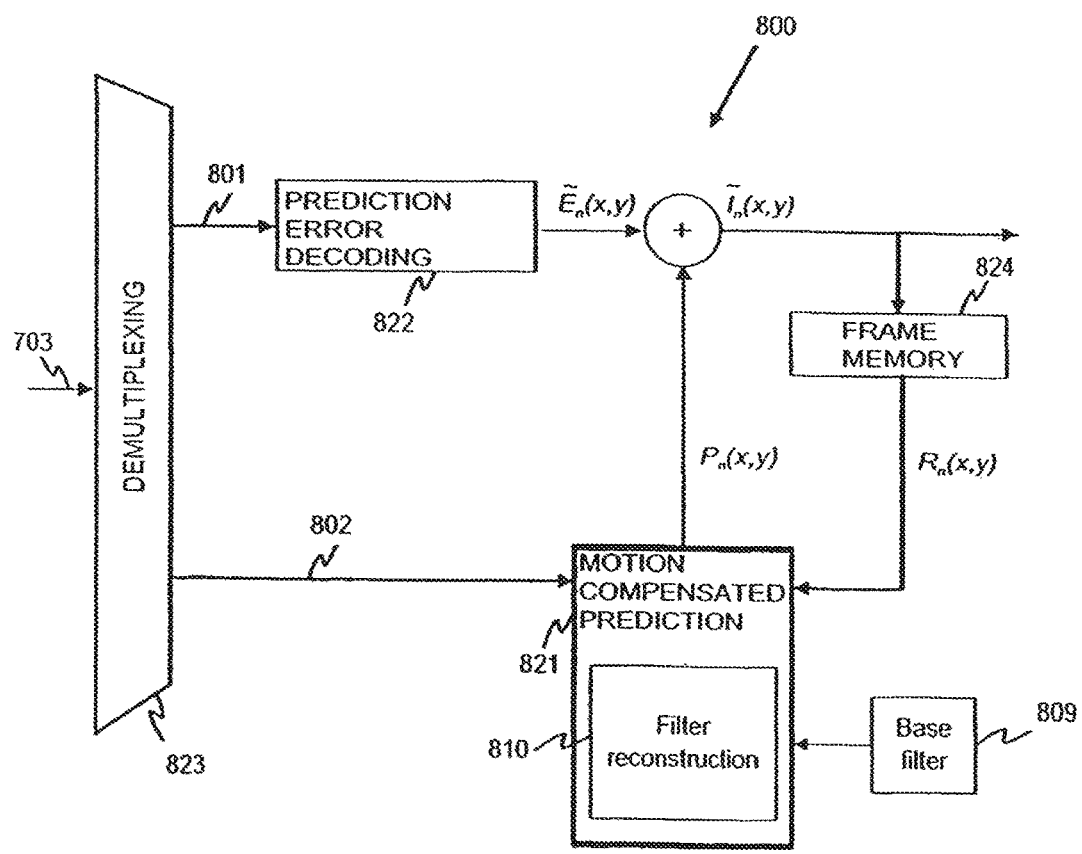
FIG. 8a is a block diagram illustrating a video decoder according to one embodiment of the present invention.

FIG. 8a is a block diagram of a video decoder 800 implemented according to an embodiment of the present invention and corresponding to the video encoder 700 illustrated in FIG. 7. The decoder 800 comprises a Motion Compensated Prediction block 821, a Prediction Error Decoding block 822, a Demultiplexing block 823 and a Frame Memory 824. The decoder 800, as shown in FIG. 8a includes a Filter Reconstruction block 810, which reconstructs the optimum interpolation filter based on the filter_type and the filter coefficients information to construct the interpolation filter from the frame.

Operation of the video decoder 800 will now be considered in detail. Demultiplexer 823 receives encoded bit-stream 703, splits the bit-stream into its constituent parts (motion coefficients, prediction error data, filter coefficient difference values and possible control information) and performs any necessary entropy decoding of the various data types. The Demultiplexer 823 forwards prediction error information retrieved from the received bit-stream 703 to Prediction Error Decoding block 822. It also forwards the received motion information to Motion Compensated Prediction block 821. In this embodiment of the present invention, the Demultiplexer 823 forwards the received (and entropy decoded) difference values via signal 802 to the Motion Compensated Prediction block 821 so as to allow the Filter Reconstruction block 810 to reconstruct the optimum interpolation filter by adding the received difference values to the coefficients of a predefined base filter 809 stored in the decoder. Motion Compensated Prediction block 821 subsequently uses the optimum interpolation filter as defined by the reconstructed coefficient values to construct a prediction for the image block currently being decoded. More specifically, Motion Compensated Prediction block 821 forms a prediction for the current image block by retrieving pixel values of a reference frame $R_n(x,y)$ stored in Frame Memory 824 and interpolating them as necessary according to the received motion information to form any required sub-pixel values. The prediction for the current image block is then combined with the corresponding prediction error data to form a reconstruction of the image block in question.

Figure 8B:
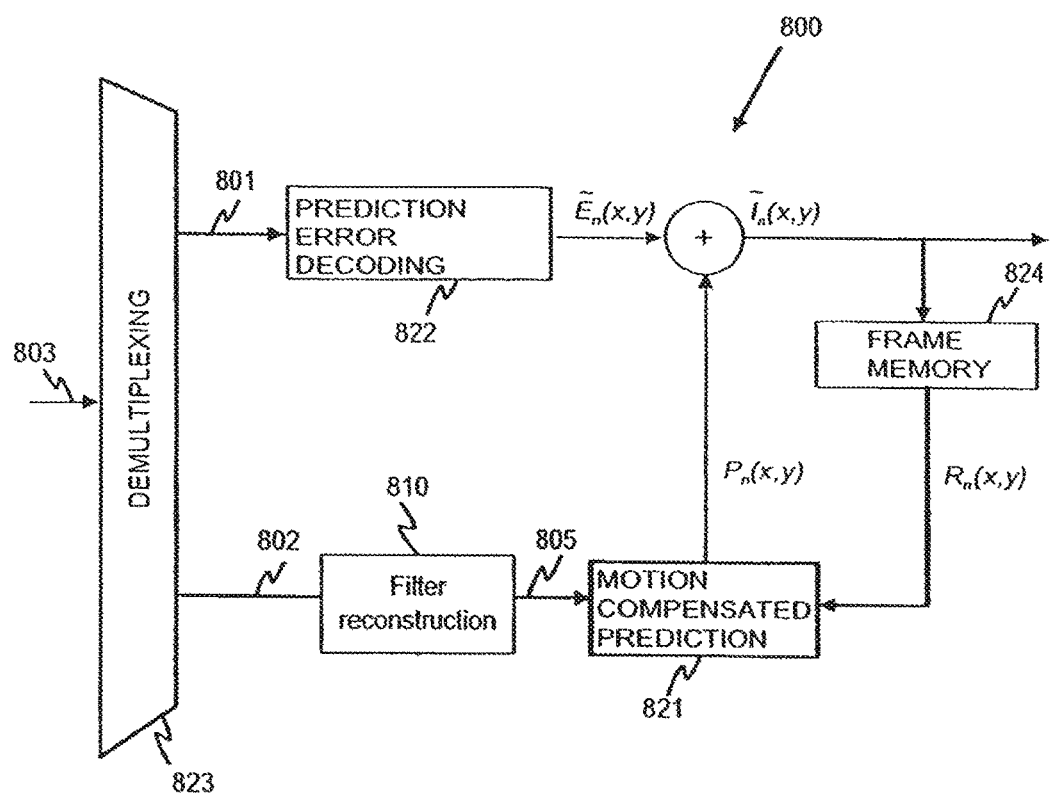
FIG. 8b is a block diagram illustrating a video decoder according to another embodiment of the present invention.

Alternatively, the Filter Reconstruction block 810 resides outside of the Motion Compensated Prediction block 821, as shown in FIG. 8b. From the difference values contained in signal 802 received from the Demultiplexer 823, the Filter Reconstruction block 810 reconstructs the optimum interpolation filters and sends the reconstruct filter coefficients 805 to the Motion Compensated Prediction block 821. In yet another alternative embodiment, the Filter Reconstruction block 810 resides in the Demultiplexer block 823. The Demultiplexer block 823 forwards the reconstructed coefficients of the optimum interpolation filter to Motion Compensated Prediction Block 821.

Figure 9A:
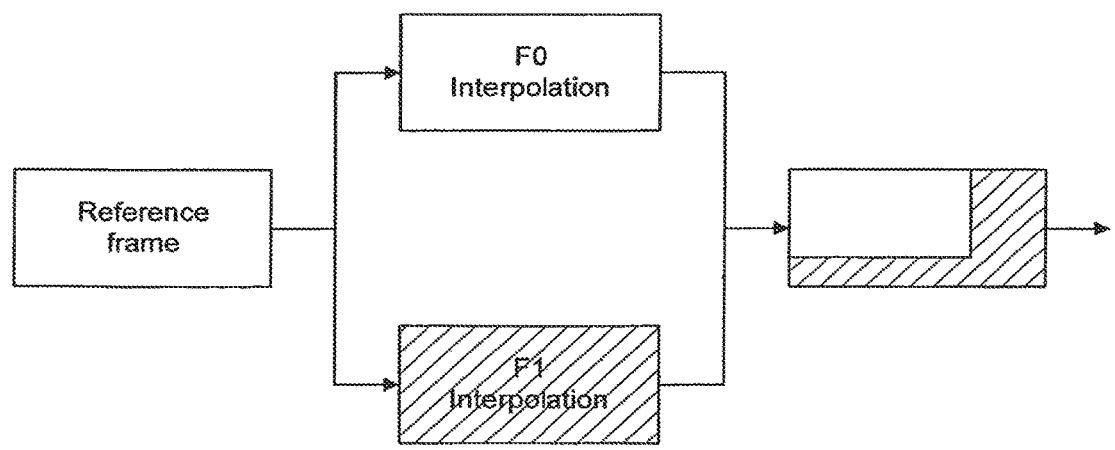
FIG. 9a shows a flowchart for classifying macroblocks for use with two interpolation filters.

FIG. 9a shows a flowchart for classifying macroblocks for use with two interpolation filters.

Figure 9B:
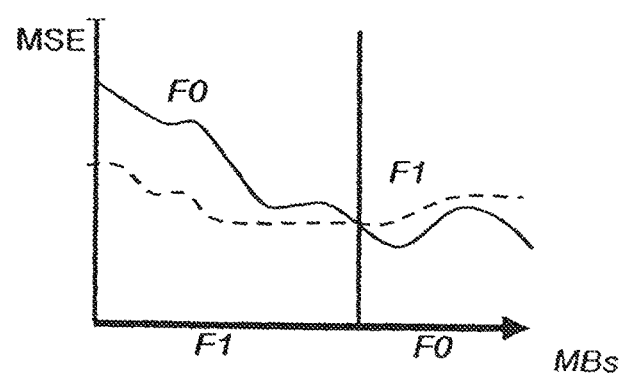
FIG. 9b shows an example of performance with two interpolation filters.

FIG. 9b shows an example of coding performance with two interpolation filters in an image frame.

In order to improve the prediction performance in video coding, it is generally desirable to adapt interpolation filter coefficient values according to local properties of the image. If quarter-pixel motion vector accuracy is assumed, as many as 15 independent filters should be signaled to the decoder. This means that a large number of bits are required in filter signaling. When the statistical characteristic of each image is symmetric, the number of coefficients can be reduced.

Assume 6-tap filters are used for interpolating pixel locations with quarter-pixel accuracy. The naming convention for locations of integer and sub-pixel samples is shown in FIG. 1. As shown in FIG. 1, integer samples are shown in shaded blocks with upper case letters and fractional samples are in white blocks with lower case letters. In particular, An, Bn, Cn, Dn, En and Fn (with n=1 to 6) are integer pixel samples surrounding the current pixel to be interpolated. The lower case letters a, b, c, d, e, f, g, h, i, j, k, l, m, n and o denote sub-pixel samples to be interpolated. Among those sub-pixel samples, locations b, h, j are half-pixel samples and all others are quarter-pixel samples. It is possible to use an independent filter for each sub-pixel location to interpolate the corresponding sub-pixel samples. For the locations a, b, c, d, h and l, a 1D filter with 6-taps can be used and a 6×6 2D filter can be used for the other locations. This approach results in transmitting 360 filter coefficients and may result in a high additional bitrate which could suppress the benefit of using an adaptive interpolation filter.

If it is assumed that the statistical properties of an image signal are symmetric, then the same filter coefficients can be used in case the distance of the corresponding full-pixel positions to the current sub-pixel position is equal. This way some sub-pixel locations use the same filter coefficients as other locations, and hence no filter coefficients are transmitted for those (e.g. filter used for interpolating h will be the same as filter used for interpolating b). Also, the number of filter coefficients used for some sub-pixel locations are decreased (e.g. number of filter coefficients required for interpolating location b decreased from 6 to 3).

Let $h_{C1}^a$ be the filter coefficient used for computing the interpolated pixel at sub-pixel position a from the integer position C1. Similarly, $h_{C1}^b$ denotes the coefficient used to compute b from the integer location C1. According to the symmetry assumption described above, for the sub-pixel positions a, c, d and l, only one filter with 6 coefficients are used, as $$h_{C1}^a = h_{A3}^d = h_{C6}^c = h_{F3}^l$$

$$h_{C3}^a = h_{C3}^d = h_{C4}^c = h_{D3}^l$$

$$h_{C5}^a = h_{E3}^d = h_{C2}^c = h_{B3}^l$$

$$h_{C2}^a = h_{B3}^d = h_{C5}^c = h_{E3}^l$$

$$h_{C4}^a = h_{D3}^d = h_{C3}^c = h_{C3}^l$$

$$h_{C6}^a = h_{F3}^d = h_{C1}^c = h_{A3}^l$$

As such, only the following coefficients will be transmitted:
  6 coefficients in total for the interpolation filter of a, c, d, L
  3 coefficients in total for the interpolation filter of b, h
  21 coefficients in total for the interpolation filter of e, g, m, o
  18 coefficients in total for the interpolation filter of f, i, k, n
  6 coefficients for the interpolation filter of j Thus, instead of transmitting 360 coefficients, only 54 coefficients are transmitted.

The number of transmitted coefficients for each filter and the corresponding decoding complexity is in Table 1.

TABLE 1

| Sub-pel Location | Number of Coefficients Transmitted | Number of Multiplications Decoder Needs to Perform |
| --- | --- | --- |
| a, c, d, l | 6 | 6 |
| b, h | 3 | 6 |
| e, g, m, o | 21 | 36 |
| f, i, k, n | 18 | 36 |
| j | 6 | 36 |

To further demonstrate the coding efficiency by assuming the statistical properties of an image signal being symmetric, the following example assuming a tap-length of 4×4, instead of having a tap-length of 6×6. In this case for locations a, b, c, h, L, a 1D 4-tap filter would be used and for the other locations a 2D 4×4-tap filter would be used. With the same assumption of image signal being statistically symmetric, number of coefficients that is transmitted would decrease to 27. Also, number of multiplications decoder needs to perform decreases significantly. Table 2 presents the details for the scheme that is based on 4-tap filter instead of 6-tap.

TABLE 2

| Sub-pel Location | Number of Coefficients Transmitted | Number of Multiplications Decoder Needs to Perform |
|---|---|---|
| a, c, d, l | 4 | 4 |
| b, h | 2 | 4 |
| e, g, m, o | 10 | 16 |
| f, i, k, n | 8 | 16 |
| j | 3 | 16 |

It can be seen from TABLE 1 and TABLE 2 that utilizing an AIF based on 4-tap filter results in less decoding complexity, and also reduces the number of bits that must be transmitted to the decoder. However, generally, an interpolation filter with shorter tap-length will not be able to reduce the prediction error and aliasing as much as a filter with longer tap size, resulting in a negative impact on coding efficiency.

In order to find out the best trade-off between decoding complexity and coding efficiency, it is possible to utilize a Rate-Distortion-Complexity framework, similar to the one presented in: Ugur, K.; Lainema J.; Hallapuro, A.; Gabbouj, M., "Generating H.264/AVC Compliant Bitstreams for Lightweight Decoding Operation Suitable for Mobile Multimedia Systems," Acoustics, Speech and Signal Processing, 2006, ICASSP 2006 Proceedings, 2006 IEEE International Conference, vol. 2, pp. 11-33-11-36, 14-19 May 2006, all of which are incorporated herein by reference in their entireties. In this case, each frame of video is encoded using different tap-lengths and choose the tap-length that minimizes the following cost function:

$$J'(N) = \overline{SSD(s,r)} + \lambda_{MODE} \cdot \overline{R(N)} + \lambda_C \cdot \overline{C(N)} \quad (1)$$

with r being the reconstruction frame obtained using the interpolation filter tap-length, N and s being the original frame. $\lambda_{MODE}$ is the Lagrangian multiplier, which is the same as the one used in mode-decision process. The first term of the above cost function is the average distortion term per macroblock, and it is given as the Sum of Square Difference (SSD) between the original and the reconstructed signal. $\underline{R(N)}$ represents the average number of bits per macroblock used to code the frame when using an interpolation filter tap-length N. $\underline{C(N)}$ is the complexity term that could be measured in different ways. In our implementation, it is measured as the average number of multiplications per macroblock that decoder needs to perform at the interpolation stage. Finally, $\lambda_C$ is the term that is used to adjust the complexity-coding efficiency trade-off.

It should be noted that, in many video sequences, however, some images do not possess symmetrical properties. For example, in a video sequence where the camera is panning horizontally resulting in a horizontal motion blur, the images may possess vertical symmetry, but not horizontal symmetry. In a complex scene where different parts in the image are moving at different directions, the images may not have any horizontal or vertical symmetry.

It is possible to use four different symmetrical properties to construct different filters, for example. These filters are referred to as adaptive interpolation filters (AIFs). The different symmetrical properties can be denoted as ALL-AIF, HOR-AIF, VER-AIF and H+V-AIF. After constructing these filters with different symmetrical properties, the symmetrical characteristic of each filter is adapted at each frame. As such, not only the filter coefficients are adapted, but the symmetrical characteristic of the filter is also adapted at each frame.

In order to use different symmetrical properties, it is possible to use the following procedure: First, the encoder performs the regular motion estimation for the frame using a base filter and calculates the prediction signal for the whole frame. The coefficients of the interpolation filter are calculated by minimizing the energy of the prediction signal. The reference picture or image is then interpolated using the calculated interpolation filter and motion estimation is performed using the newly constructed reference image.

The four types of adaptive interpolation filters assuming different symmetrical properties are described below.

ALL-AIF

In this type, a set of 6×6 independent non-symmetrical filter coefficients are sent for each sub-pixel. This means transmitting 36 coefficients for each sub-pixel, and results in transmitting 540 coefficients. This filter type spends the most number of bits for coefficients.

HOR-AIF

In this filter type, it is assumed that the statistical properties of input signal are only horizontally symmetric, but not vertically symmetric. So, same filter coefficients are used only if the horizontal distance of the corresponding full-pixel positions to the current sub-pixel position is equal. In addition, similar to the case where the statistical characteristic of each image is assumed to be symmetric, a 1D filter is used for locations a, b, c, h, l. This results in transmitting:

6 coefficients in total for the interpolation filter of a, c
   3 coefficients for the interpolation filter of b
   6 coefficients for the interpolation filter of d
   36 coefficients in total for the interpolation filter of e, g
   18 coefficients for the interpolation filter of f
   6 coefficients for the interpolation filter of h
   36 coefficients in total for the interpolation filter of i, k
   18 coefficients for the interpolation filter of j
   6 coefficients for the interpolation filter of l
   36 coefficients in total for the interpolation filter of m, o
   18 coefficients for the interpolation filter of n
   In total, 189 coefficients are sent for the HOR-AIF type of filter. The details of HOR-AIF type filter for each sub-pixel are shown in FIG. 2.

VER-AIF

This type is similar to HOR-AIF, but in this case, it is assumed that the statistical properties of input signal are only vertically symmetric. So, same filter coefficients are used only if the vertical distance of the corresponding full-pixel positions to the current sub-pixel position is equal. This results in transmitting:

6 coefficients for the interpolation filter of a
   6 coefficients for the interpolation filter of b
   6 coefficients for the interpolation filter of c
   6 coefficients in total for the interpolation filter of d, l
   36 coefficients in total for the interpolation filter of e, m
   36 coefficients in total for the interpolation filter of f, n
   36 coefficients in total for the interpolation filter of g, o
   3 coefficients for the interpolation filter of h
   18 coefficients for the interpolation filter of i
   18 coefficients for the interpolation filter of j
   18 coefficients for the interpolation filter of k In total, 189 coefficients are sent for the VER-AIF type of filter. The details of VER-AIF type filter for each sub-pixel are shown in FIG. 3.

H+V-AIF

In this filter type, it is assumed that the statistical properties of input signal are both horizontally and vertically symmetric. So, same filter coefficients are used only if the horizontal or vertical distance of the corresponding full-pixel positions to the current sub-pel position is equal. In addition, similar to the case where the statistical characteristic of each image is assumed to be symmetric, a 1D filter is used for locations a, b, c, d, l. This results in transmitting:

6 coefficients in total for the interpolation filter of a, c
3 coefficients for the interpolation filter of b
6 coefficients in total for the interpolation filter of d, l
36 coefficients in total for the interpolation filter of e, g, m, o
18 coefficients for the interpolation filter of f, n
3 coefficients for the interpolation filter of h
18 coefficients in total for the interpolation filter of i, k
9 coefficients for the interpolation filter of j.

In total 99 coefficients are sent for the H+V-AIF type of filter. The details of H+V-AIF type filter for each sub-pixel are shown in FIG. 4.

In sum, it is possible to more accurately represent frames with varying symmetrical properties by using several different filters with different symmetrical properties. These filters and their respective properties are:

ALL-AIF: A set of 6×6 independent non-symmetrical filter coefficients are sent for each sub-pel. This means transmitting 36 coefficients for each sub-pel, and results in transmitting 540 coefficients.

HOR-AIF: It is assumed that the statistical properties of input signal are only horizontally symmetric, but not vertically symmetric. So, same filter coefficients are used only if the horizontal distance of the corresponding full-pel positions to the current sub-pel position is equal.

VER-AIF: It is assumed that the statistical properties of input signal are only vertically symmetric. So, same filter coefficients are used only if the vertical distance of the corresponding full-pel positions to the current sub-pel position is equal.

H+V-AIF: It is assumed that the statistical properties of input signal are both horizontally and vertically symmetric. So, same filter coefficients are used only if the horizontal or vertical distance of the corresponding full-pel positions to the current sub-pel position is equal.

The above approach adapts the type of filter at frame level to achieve improved coding efficiency. The present invention further extends the above approach by using introducing different tap-lengths to the above-described filters. Tables 3-6 give the interpolation details for the filters for tap-lengths 4 and 6, to illustrate how the coding efficiency can be improved.

TABLE 3

| Sub-pel | Number of Coefficients Transmitted | | Number of Multiplications Decoder Needs to Perform | |
|---|---|---|---|---|
| Location | 4-TAP | 6-TAP | 4-TAP | 6-TAP |
| a | 16 | 36 | 16 | 36 |
| b | 16 | 36 | 16 | 36 |
| c | 16 | 36 | 16 | 36 |
| d | 16 | 36 | 16 | 36 |
| e | 16 | 36 | 16 | 36 |
| f | 16 | 36 | 16 | 36 |
| g | 16 | 36 | 16 | 36 |
| h | 16 | 36 | 16 | 36 |
| i | 16 | 36 | 16 | 36 |
| j | 16 | 36 | 16 | 36 |
| k | 16 | 36 | 16 | 36 |
| l | 16 | 36 | 16 | 36 |
| m | 16 | 36 | 16 | 36 |
| n | 16 | 36 | 16 | 36 |
| o | 16 | 36 | 16 | 36 |

TABLE 4

| Sub-pel | Number of Coefficients Transmitted | | Number of Multiplications Decoder Needs to Perform | |
|---|---|---|---|---|
| Location | 4-TAP | 6-TAP | 4-TAP | 6-TAP |
| a, c | 4 | 6 | 4 | 6 |
| b | 2 | 3 | 4 | 6 |
| d | 4 | 6 | 4 | 6 |
| e, g | 16 | 36 | 16 | 36 |
| f | 8 | 18 | 16 | 36 |
| h | 4 | 6 | 4 | 6 |
| i, k | 16 | 36 | 16 | 36 |
| j | 8 | 18 | 16 | 36 |
| l | 4 | 6 | 4 | 6 |
| m, o | 16 | 36 | 16 | 36 |
| n | 8 | 18 | 16 | 36 |

TABLE 5

| Sub-pel | Number of Coefficients Transmitted | | Number of Multiplications Decoder Needs to Perform | |
|---|---|---|---|---|
| Location | 4-TAP | 6-TAP | 4-TAP | 6-TAP |
| a | 4 | 6 | 4 | 6 |
| b | 4 | 6 | 4 | 6 |
| c | 4 | 6 | 4 | 6 |
| d, l | 4 | 6 | 4 | 6 |
| e, m | 16 | 36 | 16 | 36 |
| f, n | 16 | 36 | 16 | 36 |
| g, o | 16 | 36 | 16 | 36 |
| h | 2 | 3 | 4 | 6 |
| i | 8 | 18 | 16 | 36 |
| j | 8 | 18 | 16 | 36 |
| k | 8 | 18 | 16 | 36 |

TABLE 6

| Sub-pel | Number of Coefficients Transmitted | | Number of Multiplications Decoder Needs to Perform | |
|---|---|---|---|---|
| Location | 4-TAP | 6-TAP | 4-TAP | 6-TAP |
| a, c | 4 | 6 | 4 | 6 |
| b | 2 | 3 | 4 | 6 |
| d, l | 4 | 6 | 4 | 6 |
| e, g, m, o | 16 | 36 | 16 | 36 |
| f | 8 | 18 | 16 | 36 |
| h | 2 | 3 | 4 | 6 |
| i, k | 8 | 18 | 16 | 36 |
| j | 4 | 9 | 16 | 36 |

In order to demonstrate how different tap-lengths can further improve the coding efficiency when they are used in conjunction with the image signal symmetrical properties, we encode a video sequence known as "Soccer". Each frame is encoded for each candidate (filter-type-tap-length) pair. For example, if the number of candidate filter-types is 5 (those being single symmetry, HOR, VER, H+V, and ALL as described above), and number of tap-lengths are 4 and 6, each frame needs to be encoded 10 times. After encoding each candidate (filter-type, tap-length) pair, cost is calculated using Equation 2. The (filter-type, tap-length) that results the minimum cost is chosen.

$$J'(\text{filter\_type}, N) = \underline{SSD(s,r)} + \lambda_{MODE} \cdot \underline{R(N, \text{filter\_type})} + \lambda_C \cdot \underline{C(N, \text{filter\_type})} \quad (2)$$

Figure 10:
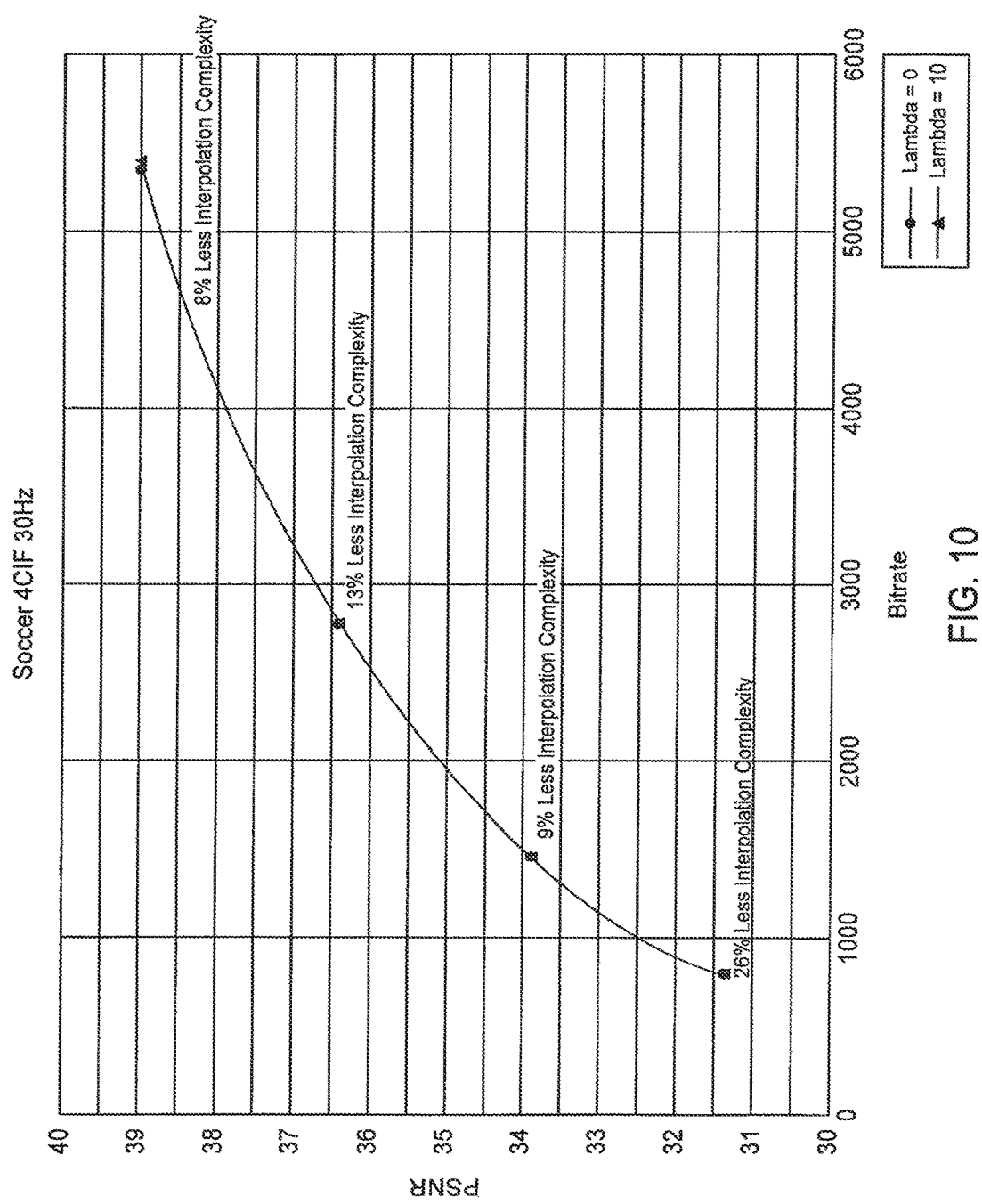
FIG. 10 shows a test result from encoding a "Soccer" test video sequence.

Sample encoding result of this approach is given in FIG. 10 for the "Soccer" test sequence using two different values for $\lambda_C$ (0 and 10 respectively). It is seen that 14% interpolation complexity reduction is achieved, without any significant decrease in coding efficiency. By increasing $\lambda_C$, more drastic complexity reduction is possible with slightly more coding efficiency drop. In the result as shown in FIG. 10, Interpolation Complexity is measured as number of multiplications.

According to the various embodiments of the present invention, the coding efficiency of a video coder can be further improved with the reduction of the decoding complexity by spatially adapting the interpolation filter characteristics used in motion compensation process. Coding efficiency is increased because the prediction error energy could be reduced by capturing the locally changing image characteristics with adaptive filters. The decoding complexity could be reduced by using interpolation filters with smaller tap-lengths at smooth regions of the image without affecting the coding efficiency.

The various embodiments of the invention may include either in separate or in combination the following tools:

Adapting the interpolation filter per block, or macroblock basis in the frame resulting in multiple interpolation filters (Interpolation Filter Bank) per frame in the motion compensated prediction. Filters could be either predefined or adapted at each frame.

Transmitting one or more interpolation filters per frame. The transmitted interpolation filters could have different characteristics, such as different tap-length, different symmetry assumptions, or different number of coefficients, etc.

The details of the interpolation filters are preferably coded in a slice or frame header of video stream. Coding of filters could be done in many ways, such as the above-described method. Alternatively, the filter coefficients could be coded predictively with respect to each other.

Indicating the interpolation filter used for each macroblock at the macroblock header. This indication refers either to adaptive filters that are transmitted or to a pre-defined ones. The indication could be done either independently for each macroblock or predictively utilizing the interpolation filter types of the neighboring macroblocks. Alternatively, this indication could be performed at another level than the macroblock header (e.g. slice header).

Alternative to the above point, automatically classifying each macroblock without the need for indicating the used interpolation filter. This classification could be done in many ways, for example by calculating the gradient direction of the reference area. Because the classification method is the same for both the encoder and decoder, exact reconstruction could be achieved.

Exemplary encoding methods to calculate number of transmitted filters, the characteristics of each filter (i.e. coefficients, symmetry assumption, tap-length etc.) and the macroblock classification information. These encoding methods could be different if one aims to reduce the decoding complexity or improve the coding efficiency.

Two exemplary encoder algorithms are described as follows:

Interpolation Filter Bank to Improve Coding Efficiency

This sample encoder algorithm uses multiple interpolation filters per frame to improve the coding efficiency of the video coding system. It is assumed that interpolation filters share the same symmetrical property which is horizontal-vertical-diagonal as defined in Y. Vatis, B. Edler, D. Nguyen and J. Ostermann, "Motion- and Aliasing-Compensated Prediction Using A Two-Dimensional Non-Separable Adaptive Wiener Interpolation Filter", *Proc. ICIP* 2005, *IEEE International Conference on Image Processing*, Genova, Italy, September 2005. However, this algorithm could be extended so that different symmetry types such as HOR, VER, H+V, and ALL can be used.

In order to minimize the prediction error energy, we use a binary-tree approach to classify the macroblocks into different sets, each one using a different interpolation filter in the MCP process. Mainly the algorithm works as follows. Initially all macroblocks are encoded using the H.264/AVC filter, and they belong to the same set, S0. Using the motion vectors found in this stage, the coefficients of the adaptive interpolation filter are calculated globally over the entire frame, by minimizing the prediction error energy. Then, the macroblocks are classified into two sets, S1 and S2, according the prediction error resulted by AVC filter and adaptive filter. If for a certain macroblock, standard H.264/AVC filter yields a smaller MSE than the adaptive filter, that macroblock belongs to S1 (or to S2, if adaptive filter yields smaller MSE than standard H.264/AVC filter) (See FIG. 9a for the illustration of this classification). We then check in order to decide whether sending an additional adaptive filter is advantageous in RD sense or not. This check is required because transmitting additional bits for the coefficients of the adaptive filter may suppress the improvement achieved by using an adaptive interpolation filter. In order to perform the check, following cost function is calculated for every possible filter combination in the filter bank $$\text{cost} = \underline{SAD_{MCP}} + \lambda \cdot AIF_{bits} \quad (1)$$

where $AIF_{bits}$ is a number of bits for adaptive interpolation filter side information, $\lambda$ is Lagrangian parameter and $SAD_{MCP}$ is an integral SAD value for the prediction error over all macroblocks. The filter combination that minimizes the cost is chosen (FIG. 8 illustrates this optimization problem).

Figure 13:
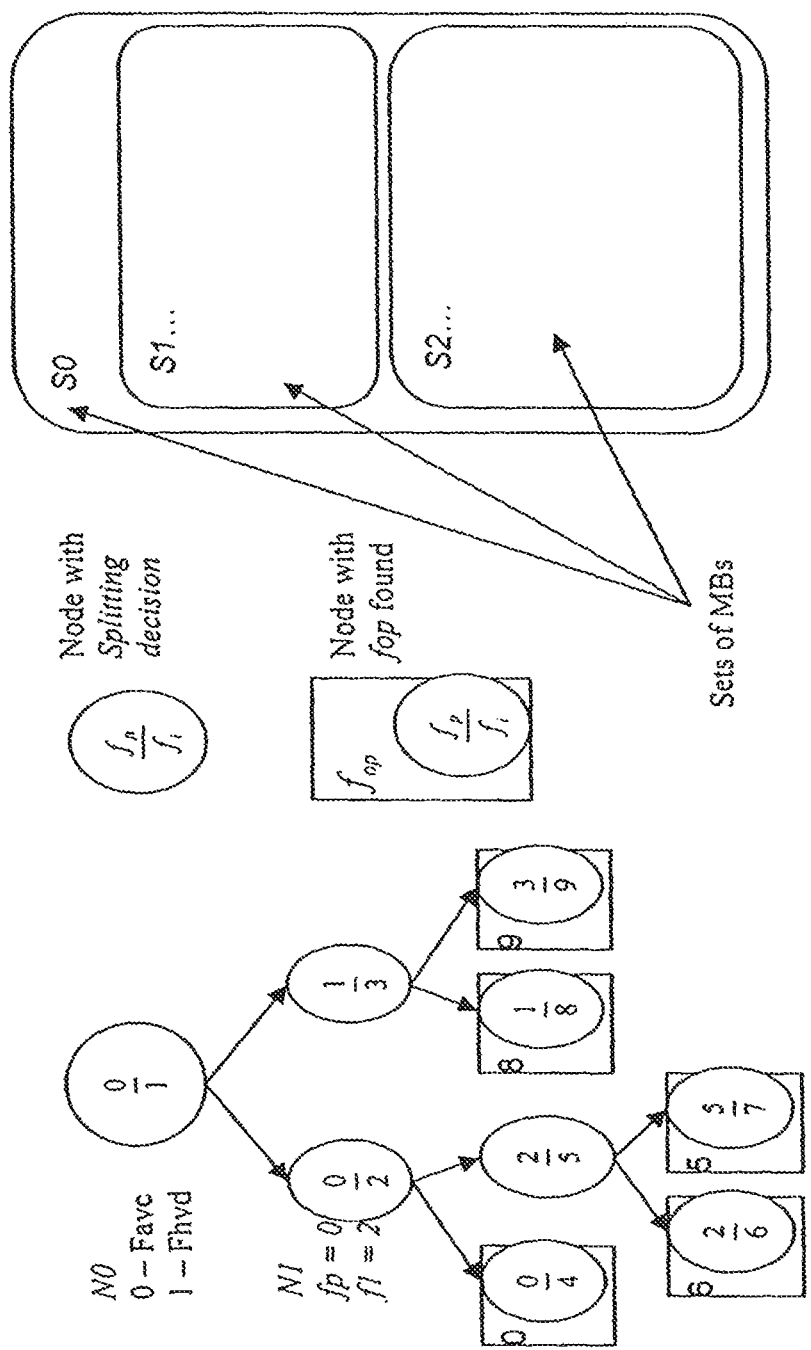
FIG. 13 illustrates an example of the decision tree for hierarchical group and sequential filter refinement.

These steps are performed for each set and a binary decision tree is constructed (see FIG. 13). The key element of the decision tree is a processing node Ni. Each Node Ni (on the left of FIG. 13) corresponds to the set of macroblock Si (on the right of FIG. 13). For each set, the above procedure is repeated, by dividing the set into two and than deciding whether the division is preferable or not. This decision process will result the following options:

1. fop=fp: Filter optimal for the parent-node is also optimal for this set. (i.e. fp gives the smallest cost, where fp is the parent-node's filter)
2. fop=fi: Filter computed over the entire set is optimal. (i.e. fi gives the smallest cost, where fi is the current set's filter)

3. Splitting decision. No single optimal filter was found; the combination of filters (fp and fi) for Si provides the lowest cost (i.e. combination of fp and fi gives the smallest cost).

If the splitting decision is made, set Si is subdivided into two subsets Si+1 and Si+2. Si+1 includes macroblocks where fp performs better than fi and set Si+2 of macroblocks where fi outperform fp. The fp and fi of node Ni will be assigned as fp to child-nodes Ni+1 and Ni+2 respectively. We recursively repeat the processing of new sub-nodes, until a single filter is defined for each Si, i.e. no new filters can reduce the cost function.

For example, see FIG. 13. Starting with set S0 and a filter pair (Favc, Fhvd), we create a node N0 with fp=Favc (standard H.264/AVC filter), and f0=Fhvd (adaptive filter). Node N0 is corresponding to the macroblock set S0, is a root node of our binary decision tree. Either fp or f0 is globally optimal for N0 or the combination of (Fp and F0) is more beneficial according to the cost minimization. If so, set S0 to be subdivided in two sub-sets S1 and S2 and two child nodes N1 and N2 to be created and processed.

The designed Filter Bank is used in the MCP of video coding and each macroblock is encoded with an optimal interpolation filter from the bank. The Filter Bank is transmitted to the decoder side in the slice header, and filter identification is transmitted on the macroblock level.

Interpolation Filter Bank to Reduce Decoding Complexity

To reduce the decoding complexity, it is possible to design a Filter Bank consisting of filters with different tap sizes.

Similar to the above algorithm, the coefficients of the adaptive filter are calculated globally over the entire frame and prediction error for each macroblock is recorded. We also upsample the reference signal using a non-adaptive filter with shorter tap-size (i.e. 4×4 non-adaptive filter), and calculate the prediction error for every macroblock. The 4×4 non-adaptive filter is a Wiener filter, adapted from the 6-tap H.264/AVC filter. At the final stage, for each macroblock, we compare the prediction errors resulted from the 6×6 adaptive filter and 4-tap non-adaptive filter. Macroblocks where using the complex adaptive filter does not improve the prediction error significantly use the simpler filter in the MCP process. Macroblock header indicates which filter shall be used in the motion compensation decoding process.

The various embodiments of the present invention can be used with any video codec that uses a sub-pixel motion compensated prediction to improve coding efficiency or provide computational scalable interpolation.

Considering the fact of independent motion compensation for each macroblock, a macroblock level AIF could be beneficial in several aspects:

1. It could improve the compression efficiency, especially for highly textured video content at high resolution.
2. It could provide an efficient use of interpolation filters with different symmetry properties adapted spatially to image signal.
3. Computational scalable video coding could be achieved. For example, there is no need to use a 6 tap adaptive interpolation filters if 4-tap is already good enough for certain areas of the image.

The various embodiments of the invention may increase complexity to the encoder, as encoder needs to check different alternatives for filter tap-length. However, fast methods for this are possible. In one embodiment of the present invention, motion estimation is performed first using the standard interpolation filter (e.g. AVC or Advanced Video Coding interpolation filter) and a prediction signal is generated. Using the prediction signal, filter coefficients are calculated for each filter type. Then, motion estimation, transform and quantization are performed for each filter type. The filter type, which results in the least number of bits for the luminance component of the image, is chosen. Fast alternatives to this encoding method exist, but this algorithm presents a practical upper bound for the proposed scheme.

The various embodiments of the present invention can be implemented in various ways. For example:

The number of filter types can vary.
The filters can be defined in different ways for example with respect to their symmetrical properties.
The filters can have different numbers of coefficients.
The 2D filters can be separable or non-separable.
The filter coefficients can be coded in various ways.
The encoder can utilize different algorithms to find the filter coefficients In signaling symmetrical properties for each sub-pixel location independently, it is possible for the encoder to signal the symmetrical characteristic of the filter once before sending the filter coefficients for all sub-pixel locations. A possible syntax for signaling is as follows:

```
adaptive_interpolation_filter( ) {
    filter_type
    For each subpixel location {
        filter_coefficients( ) Number of
    coefficients sent here depends on the
    filter_type
    }
}
```

It is also possible to include a syntax such as

```
adaptive_interpolation_filter( ) {
    For each subpixel location {
        Filter_type
        Filter_coefficients( ) Number of
    coefficients sent here depends on the
    filter_type
    }
}
```

In one embodiment of the present invention, the following signaling can be followed:

i) A filter_type selecting block at the encoder that decides on the filter type that AIF scheme uses by analyzing the input video signal.
ii) Transmitting filter_type information along with filter coefficients to the decoder. filter_type specifies what kind of interpolation filter is used from a pre-defined set of filter types. The number of filter coefficients that is sent depends on the filter_type and is pre-defined for each filter type.
iii) A set of different pre-defined filter types with different symmetrical properties that could capture the non-symmetrical statistical properties of certain input images more accurately.
iv) A filter constructing block in the decoder that uses both the filter_type and the filter coefficients information to construct the interpolation filter.

Additionally, a tap_length parameter can be transmitted along with filter-type information.

The various embodiments of the present invention increase the coding efficiency of a video coder that makes use of adaptive interpolation filtering (AIF) by decreasing the number of bits used for coding the filter coefficients. Therefore, non-stationary properties of a video signal can be captured more accurately. Using an approach such as that described herein, a video encoder, e.g., encoder 1110, transmits filter coefficients as side information to a video decoder, e.g., decoder 1160 (see FIG. 15). The encoder 1110 can change the filter coefficients on either a frame/slice or macroblock level by analyzing the video signal. The decoder 1160 uses the received filter coefficients to reconstruct an updated interpolation filter, which is described in greater detail below. It should be noted that the filter coefficients are coded without referring to other previously transmitted filter data. Therefore, the error resiliency of the system is higher than that achieved by the prior art. That is, error(s) are not carried over from the previously transmitted filter data. In addition, by allowing the base filter to change, the number of bits used for coding and transmitting the coefficients is reduced.

The coefficients of the interpolation filter are differentially coded with respect to a base filter. The base filter can either be pre-defined or signaled in the bitstream. If base filter is signaled in the bitstream, the encoder 1110 transmits side information to define the base filter as well. In order to reduce the number of bits used for the base filter, it can be assumed, for example, that the base filter is separable and symmetric. When the base filter is symmetric, only one half of the filter coefficients need to be coded because the other half can be obtained by appropriate copying. For example, a symmetric and separable base-filter defined by the following 6×6 matrix:

$$base_{SP} = \begin{bmatrix} 1 & -4 & 19 & 19 & -4 & 1 \\ -4 & 16 & -76 & -76 & 16 & -4 \\ 19 & -76 & 361 & 361 & -76 & 19 \\ 19 & -76 & 361 & 361 & -76 & 19 \\ -4 & 16 & -76 & -76 & 16 & -4 \\ 1 & -4 & 19 & 19 & -4 & 1 \end{bmatrix} / 1024$$

can be represented by a set of basis-coefficients given by [1−4 19]/32. In conjunction with the various embodiments of the present invention, a two-dimensional base filter can be utilized for differentially coding the coefficients of the interpolation filter with respect thereto. The coefficients that are used to define the base filter, referred to as "basis-coefficients" are determined by the encoder 1110 so that the total number of bits used to code the interpolation filter is minimized. In the case described above, only three basis-coefficients are needed to construct the base filter. Alternatively, depending on the size of the interpolation filter utilized, the number of required basis-coefficients can be lessened even further. For example, if the interpolation filter was a 4×4 interpolation filter, only two basis-coefficients would be transmitted for the two-dimensional base filter. The encoder 1110 may decide to use a pre-defined base filter instead of defining a separate one if transmitting the base filter coefficients does not provide any coding efficiency gain, as noted above and described in greater detail below.

It should be noted that the various embodiments of the present invention can be implemented on any video coder that uses AIF techniques. In addition, the various embodiments of the present invention can be used when motion vectors have increased accuracy, such as in ⅛ or 1/16-pixel systems. An exemplary implementation according to one embodiment of the present invention is described below.

FIG. 1 illustrates an example of an interpolation process executed in accordance with one embodiment of the present invention. For example, suppose the encoder 110 uses a non-separable, non-symmetric 6×6 tap filter for each sub-pixel location. A full-pixel resolution grid can be defined by pixels representing the top-left corner of each block, for example, denoted by A1-A6, B1-B6, C1-C6, D1-D6, E1-E6, and F1-F6. Half-pixel positions, such as those denoted by aa, bb, b, hh, ii, jj, cc, dd, h, ee, ff, and gg can also be calculated along with remaining sub-pixel positions a, c, d, e, f, g, i, j, k, l, m, n, and o. The interpolation filter for each sub-pixel location SP can be denoted by isp with coefficients $h_{SP}(ij)$. The two-dimensional base filter for sub-pixel location SP can be denoted by $base_{SP}$. In this exemplary implementation, characteristics of the two-dimensional base filter for each sub-pixel location are given as follows: For half-pixel locations b, h, and j, a two-dimensional, 6×6 tap separable symmetric filter can be utilized, where the two-dimensional base filter could be defined by using a one-dimensional filter with three basis-coefficients, because the basis filter is symmetric and separable; for quarter-pixel locations, coefficients are derived from the neighboring half-pixel base filters using a bilinear filter configuration of H.264/AVC.

According to the various embodiments of the present invention, the encoder 1110 calculates the basis-coefficients of the two-dimensional base filter. In order to calculate the basis-coefficients that would minimize the total number of bits used for the base filter coefficients, simplex optimization may be utilized. Simplex optimization is a process for minimizing a given function with N independent variables, which can be implemented, for example, as an algorithm. It should be noted that other algorithms, schemes, techniques, etc. can be utilized to minimize the given function. In the various embodiments of the present invention, the function to be minimized can be the total number of bits used for coding the base filter coefficients. The independent variables can be the basis-coefficients. As described above, the three basis-coefficients for the two-dimensional base filter are transmitted, resulting in three independent variables.

After the basis-coefficients are found, a check can be made to determine whether transmitting the basis-coefficients is advantageous or not with regard to the number of bits that would be transmitted. This can be done by comparing the total number of bits (i.e., basis-coefficients plus difference coefficient values) with the number of bits that would be used if the base filter were to be pre-defined (e.g., when utilizing an AVC base filter). If it is found that transmitting the basis-coefficients is not advantageous, in one embodiment of the invention, a one-bit flag is set to signal to the decoder 1160 that a pre-defined base filter should be used. In another embodiment of the invention, the encoder 1110 will transmit the basis-coefficients of the two-dimensional base filter.

In one embodiment of the invention, the encoder 1110 will transmit the difference values between the coefficient values of the interpolation filter, e.g., $h_{SP}$ and the coefficient values of the two-dimensional base filter, e.g., $base_{SP}$ to the decoder 1160. In another embodiment of the invention, the encoder 1110 will transmit the difference values between the basis coefficient values of the interpolation filter, e.g., $h_{SP}$ and the basis coefficient values of the two-dimensional base filter, e.g., $base_{SP}$ to the decoder 1160.

For example, assume the coefficients of the interpolation filter, $h_{SP}$, for location j is given by the following:

$$h_{SP} = \begin{bmatrix} 1 & -4 & 19 & 19 & -4 & 1 \\ -4 & 16 & -76 & -76 & 16 & -4 \\ 19 & -76 & 361 & 361 & -76 & 19 \\ 19 & -76 & 361 & 361 & -76 & 19 \\ -4 & 16 & -76 & -76 & 16 & -4 \\ 1 & -4 & 19 & 19 & -4 & 1 \end{bmatrix} /1024;$$

wherein the basis coefficients are given by [1 −4 19]/32. Assume that the base filter is obtained using the interpolation filter used in H.264/AVC with a basis coefficients [1 −5 20]/32. Then the coefficients of the base-filter is given by:

$$\begin{bmatrix} 1 & -5 & 20 & 20 & -5 & 1 \\ -5 & 25 & -100 & -100 & 25 & -5 \\ 20 & -100 & 400 & 400 & -100 & 20 \\ 20 & -100 & 400 & 400 & -100 & 20 \\ -5 & 25 & -100 & -100 & 25 & -5 \\ 1 & -5 & 20 & 20 & -5 & 1 \end{bmatrix} /1024$$

In one embodiment, the encoder transmits the difference between interpolation filter and the base filter to the decoder, which is given by:

$$\begin{bmatrix} 0 & -1 & 1 & 1 & -1 & 0 \\ -4 & 9 & -24 & -24 & 9 & -4 \\ 1 & -24 & 39 & 39 & -24 & 19 \\ 1 & -24 & 39 & 39 & -24 & 19 \\ -1 & 9 & -24 & -24 & 9 & -4 \\ 0 & -1 & 1 & 1 & -1 & 0 \end{bmatrix} /1024.$$

In another embodiment, the encoder transmits the difference between the basis coefficients of the interpolation filter and the pre-defined filter, i.e., [0 −1 1]/32.

Upon receiving the basis coefficients, the decoder 1160 constructs the two-dimensional base filter. Several alternative methods for the construction process can be used, but it can be assumed that the two-dimensional base filter has the same characteristics as the optimal interpolation filter defined in H.264/AVC (i.e., An interpolation filter that for half-pixel locations is separable and symmetric and uses the basis-coefficients. An interpolation filter for quarter-pixel locations is a bilinear filter using techniques defined in H.264/AVC.) The decoder 1160 reconstructs the optimal interpolation filter by adding the difference coefficient values to the coefficients of either the pre-defined base filter or the coefficients of the two-dimensional base filter constructed using the basis coefficients. Assume the coefficients of optimal interpolation filter, $h_{SP}$, is given as following for location j:

$$h_{SP} = \begin{bmatrix} 1 & -4 & 19 & 19 & -4 & 1 \\ -4 & 16 & -76 & -76 & 16 & -4 \\ 19 & -76 & 361 & 361 & -76 & 19 \\ 19 & -76 & 361 & 361 & -76 & 19 \\ -4 & 16 & -76 & -76 & 16 & -4 \\ 1 & -4 & 19 & 19 & -4 & 1 \end{bmatrix} /1024$$

For the example above, the decoder receives the basis coefficients [1 −5 20]/32 and the base filter is obtained as:

$$base_{SP} = \begin{bmatrix} 1 & -4 & 19 & 19 & -4 & 1 \\ -4 & 16 & -76 & -76 & 16 & -4 \\ 19 & -76 & 361 & 361 & -76 & 19 \\ 19 & -76 & 361 & 361 & -76 & 19 \\ -4 & 16 & -76 & -76 & 16 & -4 \\ 1 & -4 & 19 & 19 & -4 & 1 \end{bmatrix} /1024$$

According to one embodiment of the invention, the decoder receives a set of difference values representing the difference between interpolation filter and the base given as:

$$\begin{bmatrix} 0 & -1 & 1 & 1 & -1 & 0 \\ -4 & 9 & -24 & -24 & 9 & -4 \\ 1 & -24 & 39 & 39 & -24 & 19 \\ 1 & -24 & 39 & 39 & -24 & 19 \\ -1 & 9 & -24 & -24 & 9 & -4 \\ 0 & -1 & 1 & 1 & -1 & 0 \end{bmatrix} /1024.$$

In another embodiment, the decoder receives a set of difference values representing the difference between the basis coefficients of the interpolation filter and the base filter, e.g., [0 −1 1]/32. The decoder then reconstructs the values representing the difference between the coefficients of the interpolation filter and the base filter using the received information.

The decoder will then construct the interpolation filter by summation:

$$\begin{bmatrix} 1 & -5 & 20 & 20 & -5 & 1 \\ -5 & 25 & -100 & -100 & 25 & -5 \\ 20 & -100 & 400 & 400 & -100 & 20 \\ 20 & -100 & 400 & 400 & -100 & 20 \\ -5 & 25 & -100 & -100 & 25 & -5 \\ 1 & -5 & 20 & 20 & -5 & 1 \end{bmatrix} /1024$$

Other embodiments of the present invention can be implemented as well. For example, the base filter may have different characteristics, e.g., being non-symmetric and/or non-separable, such as the interpolation filter described above. In addition, the encoder 1110 can utilize different methods to compute the base filter. Furthermore, the coefficients of the base filter and the optimal interpolation filter could be jointly optimized to minimize the total number of bits, as opposed to merely optimizing the number of bits used to code and transmit the base filter coefficients. Yet another embodiment of the present invention can provide a base filter for quarter-pixel locations that could be extended in a different manner. Also, different base filters for different sub-pixel locations could be transmitted.

Figures 11, 12:
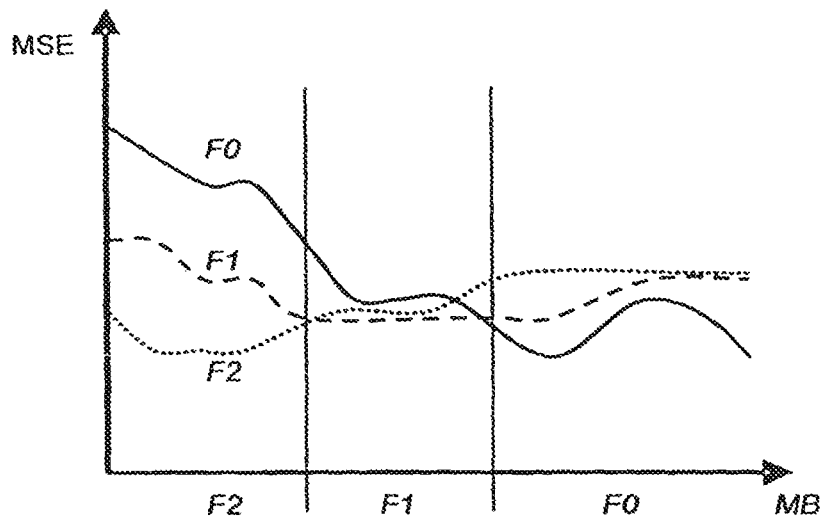
FIG. 11 shows an example of performance with three interpolation filters.
FIG. 12 shows possible combinations of three filters and the bit-overhead associated therewith.

FIG. 11 shows an example of coding performance with three interpolation filters in an image frame.

FIG. 12 shows possible combinations of three filters and bit-overhead associated with the combinations.

FIG. 13 illustrates an example of the decision tree for hierarchical grouping and sequential filter refinement.

Figure 14:
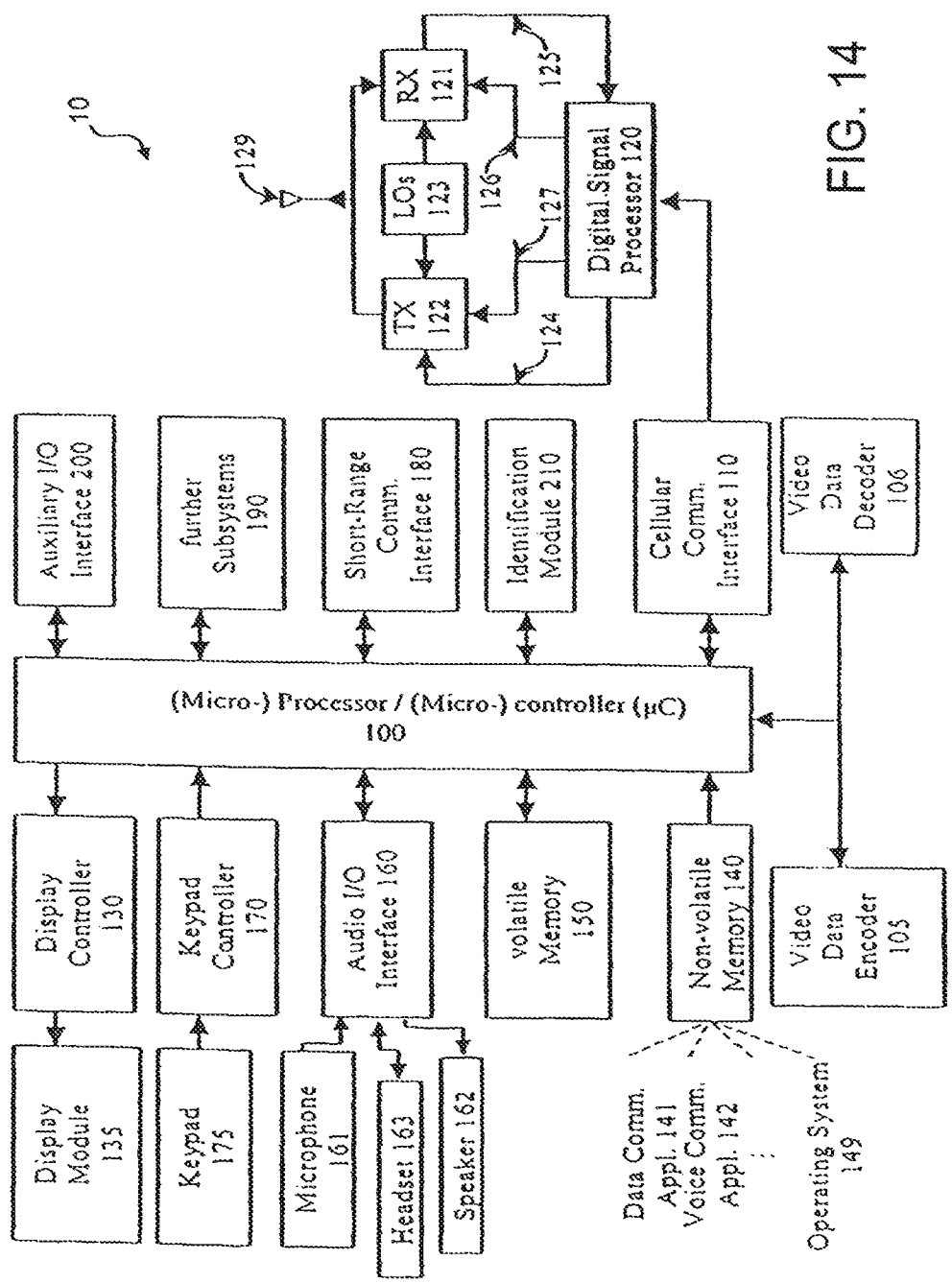
FIG. 14 is a block diagram of a terminal device comprising video encoder and decoding equipment capable of carrying out the present invention.

Referring now to FIG. 14. FIG. 14 shows an electronic device that equips at least one of the MCTF encoding module and the MCTF decoding module as shown in FIGS. 7 and 8b. According to one embodiment of the present invention, the electronic device is a mobile terminal. The mobile device 10 shown in FIG. 14 is capable of cellular data and voice communications. It should be noted that the present invention is not limited to this specific embodiment, which represents one of a multiplicity of different embodiments. The mobile device 10 includes a (main) microprocessor or micro-controller 100 as well as components associated with the microprocessor controlling the operation of the mobile device. These components include a display controller 130 connecting to a display module 135, a non-volatile memory 140, a volatile memory 150 such as a random access memory (RAM), an audio input/output (I/O) interface 160 connecting to a microphone 161, a speaker 162 and/or a headset 163, a keypad controller 170 connected to a keypad 175 or keyboard, any auxiliary input/output (I/O) interface 200, and a short-range communications interface 180. Such a device also typically includes other device subsystems shown generally at 190.

The mobile device 10 may communicate over a voice network and/or may likewise communicate over a data network, such as any public land mobile networks (PLMNs) in the form of e.g. digital cellular networks, especially GSM (global system for mobile communication) or UMTS (universal mobile telecommunications system). Typically the voice and/or data communication is operated via an air interface, i.e. a cellular communication interface subsystem in cooperation with further components (see above) to a base station (BS) or node B (not shown) being part of a radio access network (RAN) of the infrastructure of the cellular network.

The cellular communication interface subsystem as depicted illustratively in FIG. 14 comprises the cellular interface 110, a digital signal processor (DSP) 120, a receiver (RX) 121, a transmitter (TX) 122, and one or more local oscillators (LOs) 123 and enables the communication with one or more public land mobile networks (PLMNs). The digital signal processor (DSP) 120 sends communication signals 124 to the transmitter (TX) 122 and receives communication signals 125 from the receiver (RX) 121. In addition to processing communication signals, the digital signal processor 120 also provides for the receiver control signals 126 and transmitter control signal 127. For example, besides the modulation and demodulation of the signals to be transmitted and signals received, respectively, the gain levels applied to communication signals in the receiver (RX) 121 and transmitter (TX) 122 may be adaptively controlled through automatic gain control algorithms implemented in the digital signal processor (DSP) 120. Other transceiver control algorithms could also be implemented in the digital signal processor (DSP) 120 in order to provide more sophisticated control of the transceiver 121/122.

In case the mobile device 10 communications through the PLMN occur at a single frequency or a closely-spaced set of frequencies, then a single local oscillator (LO) 123 may be used in conjunction with the transmitter (TX) 122 and receiver (RX) 121. Alternatively, if different frequencies are utilized for voice/data communications or transmission versus reception, then a plurality of local oscillators can be used to generate a plurality of corresponding frequencies.

Although the mobile device 10 depicted in FIG. 14 is used with the antenna 129 as or with a diversity antenna system (not shown), the mobile device 10 could be used with a single antenna structure for signal reception as well as transmission. Information, which includes both voice and data information, is communicated to and from the cellular interface 110 via a data link between the digital signal processor (DSP) 120. The detailed design of the cellular interface 110, such as frequency band, component selection, power level, etc., will be dependent upon the wireless network in which the mobile device 10 is intended to operate.

After any required network registration or activation procedures, which may involve the subscriber identification module (SIM) 210 required for registration in cellular networks, have been completed, the mobile device 10 may then send and receive communication signals, including both voice and data signals, over the wireless network. Signals received by the antenna 129 from the wireless network are routed to the receiver 121, which provides for such operations as signal amplification, frequency down conversion, filtering, channel selection, and analog to digital conversion. Analog to digital conversion of a received signal allows more complex communication functions, such as digital demodulation and decoding, to be performed using the digital signal processor (DSP) 120. In a similar manner, signals to be transmitted to the network are processed, including modulation and encoding, for example, by the digital signal processor (DSP) 120 and are then provided to the transmitter 122 for digital to analog conversion, frequency up conversion, filtering; amplification, and transmission to the wireless network via the antenna 129.

The microprocessor/micro-controller (μC) 110, which may also be designated as a device platform microprocessor, manages the functions of the mobile device 10. Operating system software 149 used by the processor 110 is preferably stored in a persistent store such as the non-volatile memory 140, which may be implemented, for example, as a Flash memory, battery backed-up RAM, any other non-volatile storage technology, or any combination thereof. In addition to the operating system 149, which controls low-level functions as well as (graphical) basic user interface functions of the mobile device 10, the non-volatile memory 140 includes a plurality of high-level software application programs or modules, such as a voice communication software application 142, a data communication software application 141, an organizer module (not shown), or any other type of software module (not shown). These modules are executed by the processor 100 and provide a high-level interface between a user of the mobile device 10 and the mobile device 10. This interface typically includes a graphical component provided through the display 135 controlled by a display controller 130 and input/output components provided through a keypad 175 connected via a keypad controller 170 to the processor 100, an auxiliary input/output (I/O) interface 200, and/or a short-range (SR) communication interface 180. The auxiliary I/O interface 200 comprises especially USB (universal serial bus) interface, serial interface, MMC (multimedia card) interface and related interface technologies/standards, and any other standardized or proprietary data communication bus technology, whereas the short-range communication interface radio frequency (RF) low-power interface includes especially WLAN (wireless local area network) and Bluetooth communication technology or an IRDA (infrared data access) interface. The RF low-power interface technology referred to herein should especially be understood to include any IEEE 801.xx standard technology, which description is obtainable from the Institute of Electrical and Electronics Engineers. Moreover, the auxiliary I/O interface 200 as well as the short-range communication interface 180 may each represent one or more interfaces supporting one or more input/output interface technologies and communication interface technologies, respectively.

The operating system, specific device software applications or modules, or parts thereof, may be temporarily loaded into a volatile store 150 such as a random access memory (typically implemented on the basis of DRAM (direct random access memory) technology for faster operation). Moreover, received communication signals may also be temporarily stored to volatile memory 150, before permanently writing them to a file system located in the non-volatile memory 140 or any mass storage preferably detachably connected via the auxiliary I/O interface for storing data. It should be understood that the components described above represent typical components of a traditional mobile device 10 embodied herein in the form of a cellular phone. The present invention is not limited to these specific components and their implementation is depicted merely for illustration and for the sake of completeness.

An exemplary software application module of the mobile device 10 is a personal information manager application providing PDA functionality including typically a contact manager, calendar, a task manager, and the like. Such a personal information manager is executed by the processor 100, may have access to the components of the mobile device 10, and may interact with other software application modules. For instance, interaction with the voice communication software application allows for managing phone calls, voice mails, etc., and interaction with the data communication software application enables for managing SMS (soft message service), MMS (multimedia service), e-mail communications and other data transmissions. The non-volatile memory 140 preferably provides a file system to facilitate permanent storage of data items on the device particularly including calendar entries, contacts etc. The ability for data communication with networks, e.g. via the cellular interface, the short-range communication interface, or the auxiliary I/O interface enables upload, download, and synchronization via such networks.

The application modules 141 to 149 represent device functions or software applications that are configured to be executed by the processor 100. In most known mobile devices, a single processor manages and controls the overall operation of the mobile device as well as all device functions and software applications. Such a concept is applicable for today's mobile devices. The implementation of enhanced multimedia functionalities includes, for example, reproducing of video streaming applications, manipulating of digital images, and capturing of video sequences by integrated or detachably connected digital camera functionality. The implementation may also include gaming applications with sophisticated graphics and the necessary computational power. One way to deal with the requirement for computational power, which has been pursued in the past, solves the problem for increasing computational power by implementing powerful and universal processor cores. Another approach for providing computational power is to implement two or more independent processor cores, which is a well known methodology in the art. The advantages of several independent processor cores can be immediately appreciated by those skilled in the art Whereas a universal processor is designed for carrying out a multiplicity of different tasks without specialization to a pre-selection of distinct tasks, a multi-processor arrangement may include one or more universal processors and one or more specialized processors adapted for processing a predefined set of tasks. Nevertheless, the implementation of several processors within one device, especially a mobile device such as mobile device 10, requires traditionally a complete and sophisticated re-design of the components.

In the following, the present invention will provide a concept which allows simple integration of additional processor cores into an existing processing device implementation enabling the omission of expensive complete and sophisticated redesign. The inventive concept will be described with reference to system-on-a-chip (SoC) design. System-on-a-chip (SoC) is a concept of integrating at least numerous (or all) components of a processing device into a single high-integrated chip. Such a system-on-a-chip can contain digital, analog, mixed-signal, and often radio-frequency functions—all on one chip. A typical processing device comprises a number of integrated circuits that perform different tasks. These integrated circuits may include especially microprocessor, memory, universal asynchronous receiver-transmitters (UARTs), serial/parallel ports, direct memory access (DMA) controllers, and the like. A universal asynchronous receiver-transmitter (UART) translates between parallel bits of data and serial bits. The recent improvements in semiconductor technology cause very-large-scale integration (VLSI) integrated circuits to enable a significant growth in complexity, making it possible to integrate numerous components of a system in a single chip. With reference to FIG. 14, one or more components thereof, e.g. the controllers 130 and 170, the memory components 150 and 140, and one or more of the interfaces 200, 180 and 110, can be integrated together with the processor 100 in a signal chip which forms finally a system-on-a-chip (Soc).

Additionally, the device 10 is equipped with a module for scalable encoding 105 and scalable decoding 106 of video data according to the inventive operation of the present invention. By means of the CPU 100 said modules 105, 106 may individually be used. However, the device 10 is adapted to perform video data encoding or decoding respectively. Said video data may be received by means of the communication modules of the device or it also may be stored within any imaginable storage means within the device 10. Video data can be conveyed in a bitstream between the device 10 and another electronic device in a communications network.

Figure 15:
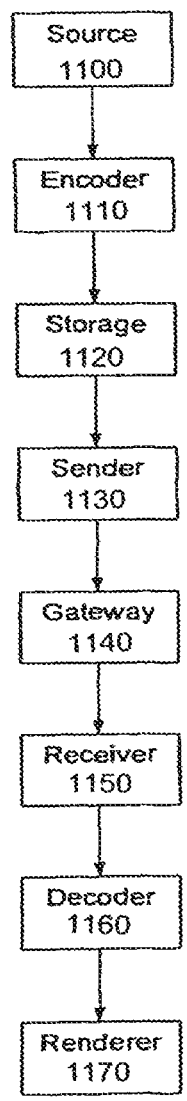
FIG. 15 is a block diagram of a generic multimedia communications system for use with the present invention.

FIG. 15 shows a generic multimedia communications system that carries out the present invention. As shown in FIG. 15, a data source 1100 provides a source signal in an analog, uncompressed digital, or compressed digital format, or any combination of these formats. An encoder 1110 encodes the source signal into a coded media bitstream. The encoder 1110 may be capable of encoding more than one media type, such as audio and video, or more than one encoder 1110 may be required to code different media types of the source signal. The encoder 1110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 1110 is considered to simplify the description without a lack of generality.

It should be understood that, although text and examples contained herein may specifically describe an encoding process, one skilled in the art would readily understand that the same concepts and principles also apply to the corresponding decoding process and vice versa.

The coded media bitstream is transferred to a storage 1120. The storage 1120 may comprise any type of mass memory to store the coded media bitstream. The format of the coded media bitstream in the storage 1120 may be an elementary self-contained bitstream format, or one or more coded media bitstreams may be encapsulated into a container file. Some systems operate "live", i.e. omit storage and transfer coded media bitstream from the encoder 1110 directly to a sender 1130. The coded media bitstream is then transferred to the sender 1130, also referred to as the server, on a need basis. The format used in the transmission may be an elementary self-contained bitstream format, a packet stream format, or one or more coded media bitstreams may be encapsulated into a container file. The encoder 1110, the storage 1120, and the sender 1130 may reside in the same physical device or they may be included in separate devices. The encoder 1110 and the sender 1130 may operate with live real-time content, in which case the coded media bitstream is typically not stored permanently, but rather buffered for small periods of time in the content encoder 1110 and/or in the sender 1130 to smooth out variations in processing delay, transfer delay, and coded media bitrate.

The sender 1130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 1130 encapsulates the coded media bitstream into packets. For example, when RTP is used, the sender 1130 encapsulates the coded media bitstream into RTP packets according to an RTP payload format. Typically, each media type has a dedicated RTP payload format. It should be again noted that a system may contain more than one sender 1130, but for the sake of simplicity, the following description only considers one sender 1130.

The sender 1130 may or may not be connected to a gateway 1140 through a communication network. The gateway 1140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 1140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 1140 is called an RTP mixer and acts as an endpoint of an RTP connection.

The system includes one or more receivers 1150, typically capable of receiving, de-modulating, and de-capsulating the transmitted signal into a coded media bitstream. The codec media bitstream is typically processed further by a decoder 1160, whose output is one or more uncompressed media streams. Finally, a renderer 1170 may reproduce the uncompressed media streams with a loudspeaker or a display, for example. The receiver 1150, the decoder 1160, and the renderer 1170 may reside in the same physical device or they may be included in separate devices.

It should be noted that the bitstream to be decoded can be received from a remote device located within virtually any type of network. Additionally, the bitstream can be received from local hardware or software.

In sum, the present invention provides a method, a system and a software application product (embedded in a computer readable medium, for example) for use in digital video image encoding and decoding. The method comprises selecting a filter type based on symmetrical properties of the images; calculating coefficient values of an interpolation filter based on the selected filter type; and providing the coefficient values and the filter tap-length along with the selected filter-type in the encoded video data. The coefficient values are also calculated based on a prediction signal representative of the different between a video frame and a reference image. The prediction signal is calculated from the reference image based on a predefined base filter and motion estimation performed on the video frame. The predefined base filter has fixed coefficient values. The coefficient values are selected from interpolation of pixel values in a selected image segment in the video frame. The symmetry properties of the images can be a vertical symmetry, a horizontal symmetry and a combination thereof. The interpolation filter is symmetrical according to the selected filter type such that only a portion of the filter coefficients are coded. In decoding, the process involves retrieving from the encoded video data a set of coefficient values of an interpolation filter and a filter-type of the interpolation filter; constructing the interpolation filter based on the set of coefficient values, the filter-type and a predefined base filter according to the indicated tap-length; and reconstructing the pixel values in a frame of the video sequence based on the constructed interpolation filter and the encoded video data Although the invention has been described with respect to one or more embodiments thereof, it will be understood by those skilled in the art that the foregoing and various other changes, omissions and deviations in the form and detail thereof may be made without departing from the scope of the present invention.

The invention claimed is:

1. A method for encoding images in a digital video sequence, comprising:
    based on symmetry of statistical properties of the images in the digital video sequence, selecting an interpolation filter used in motion compensated prediction from the group consisting of:
        a first filter type in which the same filter coefficients are used for the same distances of full-pixel positions to sub-pixel positions in both the horizontal and vertical directions;
        a second filter type in which the same filter coefficients are used for the same distances of full-pixel positions to sub-pixel positions in the horizontal direction;
        a third filter type in which the same filter coefficients are used for the same distances of full-pixel positions to sub-pixel positions in the vertical direction;
        a fourth filter type in which the same filter coefficients are used for the same distances of full-pixel positions to sub-pixel positions in the horizontal direction, and in which the same filter coefficients are used for the same distances of full-pixel positions to sub-pixel positions in the vertical direction; and
        a non-symmetrical filter type;
    calculating coefficient values for the selected interpolation filter based on a minimization of energy of a prediction error signal; and
    providing encoded data indicative of the digital video sequence for communication to a video decoder, the encoded data comprising information indicating:
        the selected filter type for the interpolation filter;
        the calculated coefficient values for the interpolation filter; and
        a tap length indicating a number of the coefficient values of the interpolation filter.

2. The method of claim 1, wherein the digital video sequence comprises a sequence of video frames;

and wherein the prediction error signal is representative of a difference between a selected one of the video frames and a reference image.

3. The method of claim 1, wherein the digital video sequence comprises a sequence of video frames;

and wherein each video frame of the sequence of video frames is partitioned in a plurality of sections, at least one section of the plurality of sections having a different symmetry property from other sections of the plurality of sections.

4. The method of claim 3, wherein the interpolation filter comprises a filter for the at least one section and one or more other filters for the other sections.

5. An apparatus for encoding images in a digital video sequence, the apparatus comprising:

at least one processor; and at least one memory including computer program code, the at least one memory and the computer program code configured to, with the processor, cause the apparatus at least to:

based on symmetry of statistical properties the images in the digital video sequence, select an interpolation filter used in motion compensated prediction from the group consisting of:

a first filter type in which the same filter coefficients are used for the same distances of full-pixel positions to sub-pixel positions in both the horizontal and vertical directions;

a second filter type in which the same filter coefficients are used for the same distances of full-pixel positions to sub-pixel positions in the horizontal direction;

a third filter type in which the same filter coefficients are used for the same distances of full-pixel positions to sub-pixel positions in the vertical direction;

a fourth filter type in which the same filter coefficients are used for the same distances of full-pixel positions to sub-pixel positions in the horizontal direction, and in which the same filter coefficients are used for the same distances of full-pixel positions to sub-pixel positions in the vertical direction; and a non-symmetrical filter type;

calculate coefficient values for the selected interpolation filter based on a minimization of energy of a prediction error signal; and provide encoded data indicative of the digital video sequence for communication to a video decoder, the encoded data including information indicating:

the selected filter type for the interpolation filter;

the calculated coefficient values for the interpolation filter; and a tap length indicating a number of the coefficient values of the interpolation filter.

6. The apparatus of claim 5, wherein the digital video sequence comprises a sequence of video frames;

and wherein the prediction error signal is representative of a difference between a selected one of the video frames and a reference image.

7. The apparatus of claim 5, wherein the digital video sequence comprises a sequence of video frames;

and wherein each video frame of the sequence of video frames is partitioned in a plurality of sections, at least one section of the plurality of sections having a different symmetry property from other sections of the plurality of sections.

8. The apparatus of claim 7, wherein the interpolation filter comprises a filter for the at least one section and one or more other filters for the other sections.

* * * * *